United States Patent [19]

Bonaventura et al.

[11] Patent Number: 4,602,987
[45] Date of Patent: Jul. 29, 1986

[54] SYSTEM FOR THE EXTRACTION AND UTILIZATION OF OXYGEN FROM FLUIDS

[75] Inventors: Joseph Bonaventura; Celia Bonaventura, both of Beaufort, N.C.; Joseph C. Van Ryzin, Kailua, Hi.; Bruce D. Zenner, Beaufort; C. William Anderson, Durham, both of N.C.

[73] Assignee: Aquanautics Corporation, San Francisco, Calif.

[21] Appl. No.: 653,850

[22] Filed: Sep. 24, 1984

[51] Int. Cl.$^4$ .............................................. C25B 1/02
[52] U.S. Cl. ................................... 204/129; 204/130; 261/DIG. 28; 422/48; 423/129; 423/579
[58] Field of Search .................... 204/130, 129; 55/16; 422/48; 423/579, 129; 261/DIG. 28, 101

[56] References Cited

U.S. PATENT DOCUMENTS

| | | | |
|---|---|---|---|
| 4,008,047 | 2/1977 | Petersen | 422/48 |
| 4,011,306 | 3/1977 | Fox, Jr. | 423/579 |
| 4,198,792 | 4/1980 | Christensen et al. | 423/579 |
| 4,287,170 | 9/1981 | Erickson | 423/579 |
| 4,422,936 | 12/1983 | Riede et al. | 422/48 |
| 4,442,297 | 4/1984 | Hill et al. | 549/200 |
| 4,444,662 | 4/1984 | Conover | 422/48 |
| 4,475,994 | 10/1984 | Gagne et al. | 204/129 |
| 4,514,522 | 4/1985 | Sievers et al. | 521/53 |
| 4,542,010 | 9/1985 | Roman et al. | 423/579 |

OTHER PUBLICATIONS

U.S. Bureau of Mines Information, Circular No. 7906, 1959, Stewart et al., Investigation of Oxygen Production by Metal Chelates.
Industrial and Engineering Chemistry, vol. 39, No. 1, 10/1947.
Fogler, Regenerative Unit for Generating Oxygen Compressed Air Magazine, Nitrogen, Jul. 1985.
Chemtech, 9/76, Aircraft Systems based on Metal Chelates.
Puxeddu et al., Equilibrium and Kinetic Parameters of the Oxygenation Reaction of Oxygen Carriers, Conformational . . . Electrochemistry 1981.
Wilson et al., A Synthetic Copper(I) Oxygen-Carrier as a Hemocyanin Model Compound 7/80.
Wong et al., Oxidation Recution Reactions of Complexes with Macrocyclic Ligands, Oxygen Uptake Kinetics, Equilibria, and Intermediate in Aqueous $CO^{11}(N_4)$ Systems, J. Amer. Chem. Soc. 1980, vol. 102, No. 17.

(List continued on next page.)

Primary Examiner—R. L. Andrews
Attorney, Agent, or Firm—Oblon, Fisher, Spivak, McClelland & Maier

[57] ABSTRACT

A method for extracting oxygen from a fluid environment, which comprises the steps of (1) contacting a first fluid environment containing oxygen with a first surface of a first oxygen permeable membrane having a first and a second surface, wherein the membrane separates the environment from an interior space of a closed container, (2) transporting a carrier fluid into contact with the second surface of the membrane, wherein the carrier fluid is confined in the closed container and the carrier fluid contains a binding-state oxygen carrier, whereby oxygen which diffuses through the membrane binds to the carrier to give a bound oxygen complex, (3) transporting the carrier fluid containing the bound oxygen complex to a first electrode compartment of an electrochemical cell which forms a second portion of the closed container, (4) electrochemically modifying the binding-state oxygen carrier to an oxidation state having less binding affinity for oxygen, thereby releasing free oxygen into the carrier fluid and producing a nonbinding-state oxygen carrier, (5) removing oxygen from the carrier fluid, (6) transporting the carrier fluid containing the nonbinding-state oxygen carrier to a second electrode compartment of an electrochemical cell which forms a third portion of the closed container, and (7) electrochemically modifying the nonbinding-state oxygen carrier to the binding-state oxygen carrier, is disclosed along with an apparatus useful for carrying out the method of the invention.

20 Claims, 19 Drawing Figures

OTHER PUBLICATIONS

Harris et al., Electrochemical Investigation of a Series of Peroxo-Bridged Binoclear Cobalt Complexes, Inorg. Chem., 1980, 19, pp. 21–26.

McLendon et al., Macrocycle-Promoted Oxygenation Reactions: 6/81.

Equatorial and Axial Ligand Effects, Inorg. Chem. vol. 17, #2, 1978.

Macor et al., Oxidative Electrochemistry of Electropolymerized Metalloprotoporphyrin Films, Princeton Univ. 1983.

Jones et al., Rodox Chemistry of Iron Tetraphenylporphyrin, Imidazolate-Chelated Protoheme, and Tholate-Chelated Protoheme.

$O_2$ EXTRACTION FLUID SYSTEM

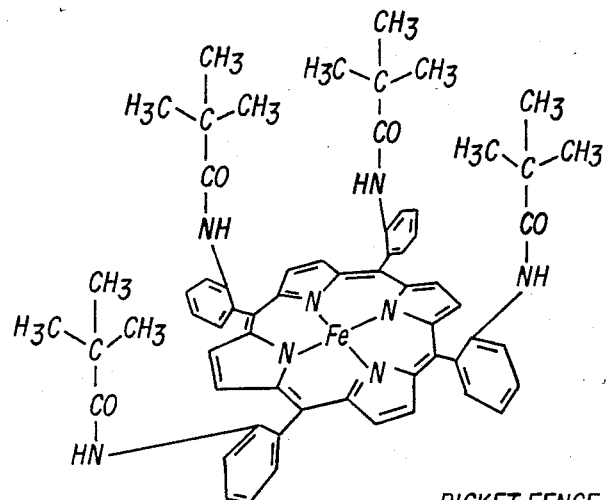
FIG. 17A PICKET FENCE PORPHYRIN SHOWN WITH IRON IN CENTER
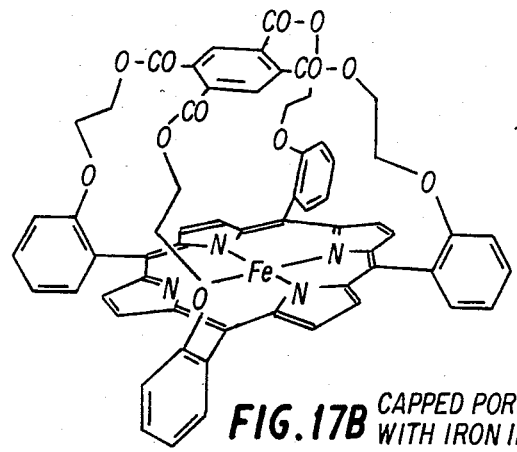
FIG. 17B CAPPED PORPHYRIN WITH IRON IN CENTER

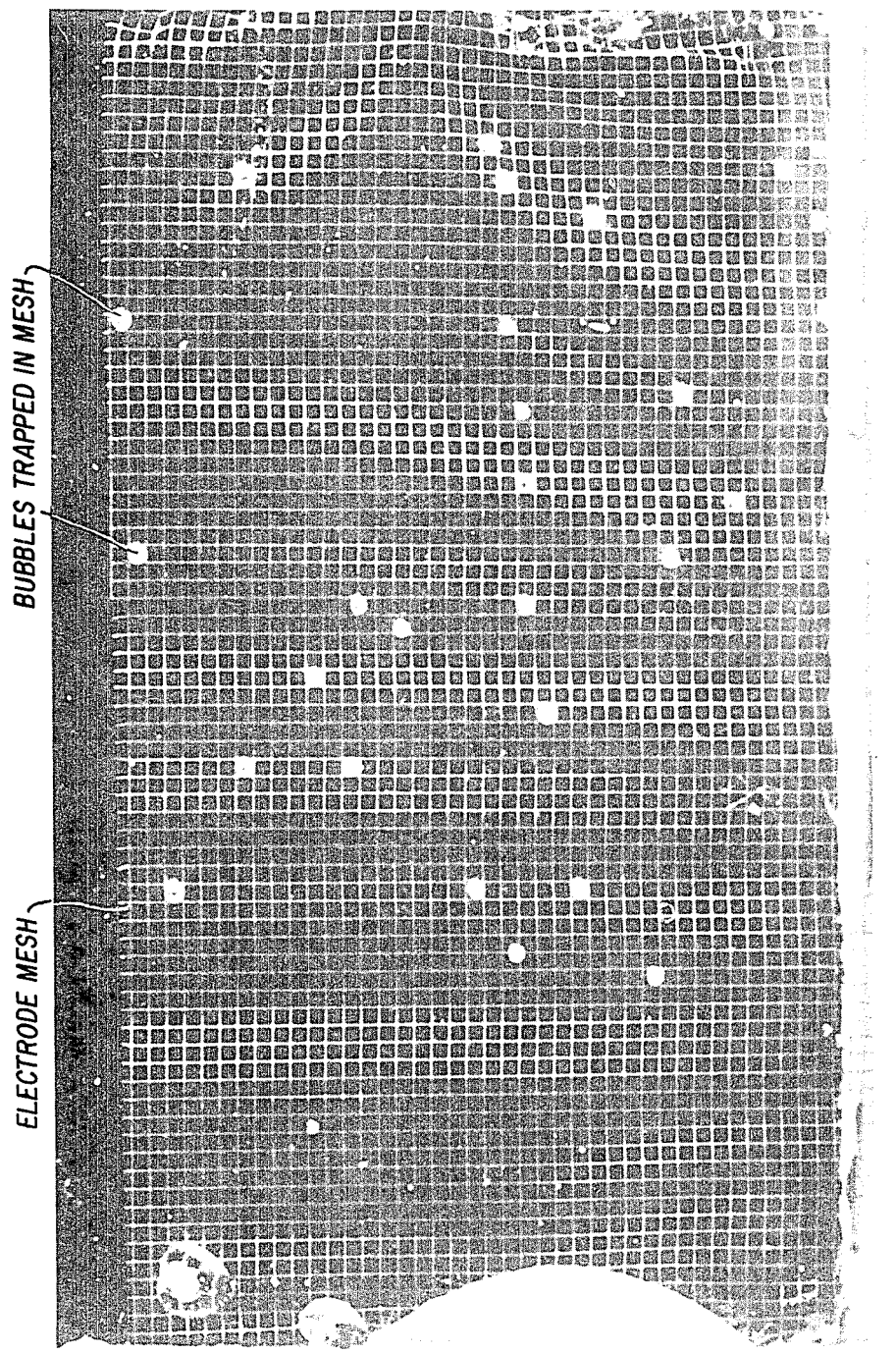
FIG. 19 BUBBLES PRODUCED BY OXIDIZING THE CARRIER SYSTEM. Fe (CAPPED) PORPHYRIN IN DMSO/1-Me-IMIDAZOLE

SYSTEM FOR THE EXTRACTION AND UTILIZATION OF OXYGEN FROM FLUIDS

BACKGROUND OF THE INVENTION

1. Field of the Invention

This invention relates to an apparatus for and a process of extracting oxygen from fluids in which oxygen is dissolved.

2. Description of the Prior Art

Oxygen is required in many important chemical reactions utilized by humans, the most important being life-supporting respiration. When these reactions are carried out on the surface of the earth, the oxygen content of air is often sufficient to provide enough oxygen for the desired reaction. However, there are many instances when oxygen is required at concentrations higher than those normally present in air. For example, pure oxygen is required in large quantities by the steel industry. Oxygen is used to volatilize carbon and other nonmetal impurities with greater speed and control than would be possible if air alone were used. Persons having lung disorders which interfere with their ability to obtain oxygen from air likewise require purified oxygen for home or hospital use. Miners working in so-called bad air, i.e., air of less than normal oxygen content, require bottled oxygen at present. Oxygen has proven highly efficient for the treatment of liquid effluents in sewage. Incineration of wastes in closed systems using pure oxygen has become an important method for disposing of toxic wastes.

Although various preparative methods exist for producing oxygen on a small scale, oxygen is generally prepared by the fractional distillation of liquid air when it is required in large quantities. Typically, filtered air is passed through an alkali absorbant in order to remove moisture and carbon dioxide. The air is then compressed, and the heat of compression is removed by ordinary cooling procedures. The cooled and compressed air is then allowed to expand, taking advantage of the fact that a compressed gas cools as it expands. The compressed gas is then recompressed, cooled, and expanded again multiple times in order to finally produce liquified air. The liquid air is allowed to warm in order to boil off nitrogen and other light impurities, leaving liquid oxygen. The liquid oxygen may be stored in that form or as compressed gaseous oxygen.

Although this process produces oxygen in a commercially useful form, it is a process which requires a large immovable plant and a delivery system for transporting either cryogenic liquid oxygen or compressed gas. While the oxygen distribution system has worked well for the steel industry, there are many applications where local production of oxygen would be useful. For example, home or hospital generators of oxygen would be extremely useful for persons afflicted with breathing disorders. Even large consumers of oxygen, such as the steel industry, would benefit by a process which reduces the energy requirements of producing oxygen from air by liquification.

Furthermore, one of the primary problems which hinders man in his efforts to explore and develop the ocean realms is the lack of a ready supply of oxygen. In most of the world's oceans, the oxygen content of both shallow and deep waters is similar to that of surface water in equilibrium with air. Practical methods have not yet been devised for extracting and utilizing this vast amount of oxygen for the maintenance of man in an undersea environment. Fish, however, have obviously solved the problem of oxygen extraction from seawater. Fish species weighing well over a thousand pounds and burning metabolities at rates roughly comparable to that of man easily extract adequate dissolved oxygen from seawater for their varied activities. Moreover, many species of fish transfer oxygen from seawater into a gaseous state. These fish, ones that possess swim bladders, are able to pump and concentrate oxygen against enormous hydrostatic pressure gradients. In certain fish species oxygen is transported from the dissolved state in seawater, with a $_pO_2$ of 0.2 atmospheres, to a gaseous phase in the swim bladder where the $_pO_2$ may exceed 100 atmospheres.

Many attempts to develop methodologies of extracting oxygen from gaseous mixtures or water are known. Warne et al, U.S. Pat. Nos. 2,217,850, and Folger et al, 2,450,276, disclose processes of separating oxygen from other gases using solutions of cobalt compounds. However, these techniques would be ineffective in a liquid system, e.g., seawater, since the compounds are in solution and would be washed away if contacted with liquids rather than the disclosed gases. Miller, U.S. Pat. No. 3,230,045, discloses using oxygen-binding chromoproteins such as hemoglobin and hemocyanin to separate oxygen from other gases. The chromoproteins are kept moist or in solution and are immobilized on filter paper where they may be bound by a binder such as fibrin; an electrolyte such as sodium chloride may also be present. However, this technique would also be ineffective in a liquid system since the protein is not insoluble and thus would be washed away if water were allowed to flow through the system. Moreover, there is no provision for regeneration of oxidized (inactive) oxygen carriers that would be formed in this system. Bodell, U.S. Pat. Nos. 3,333,583, and Robb, 3,369,343, disclose apparatus for extracting oxygen from seawater using thin tubes of silicone rubber or a membrane of silicone rubber, respectively. However, neither the capillary networks nor the permeable membranes working alone have been found to be practicable in real-life situations. Isomura, U.S. Pat. No. 3,377,777, discloses concentrating oxygen from natural waters by equilibration with exhaled gases, i.e., by utilizing large areas of gas-water interface and simple diffusional considerations such that the partial pressure of the gas phase and the partial pressure of the liquid phase in the extraction zone provide for release of oxygen from the liquid phase into the gas phase and absorption of $CO_2$ by the water phase. Additionally, the solubility of oxygen in seawater is decreased by heating the seawater, and this heating also increases the solubility of $CO_2$. However, the requirement of heating the seawater results in an energetically undesirable process. Rind, U.S. Pat. No. 4,020,833, discloses an oxygen source for closed environments comprising a mixture of a metallic superoxide, which releases oxygen upon contact with $CO_2$ and water vapor, and a material which absorbs $CO_2$. However, this system suffers from the defect of the capacity being limited by the bulk amount of mixture which can be carried, i.e., it is not capable of continuously producing oxygen without replenishment. Iles et al, U.S. Pat. No. 4,165,972, discloses separating oxygen from gas mixtures using metal chelates as sorbents. However, the technique is not extendable to the extraction of oxygen from water.

Many compounds in solution have been examined with respect to their oxygen absorption properties and the mechanistics thereof. The properties of hemoglobins, hemerythrins and hemocyanins, the naturally occurring oxygen carriers, have been the subject of numerous studies, as documented in Bonaventura et al, J. Am. Zool., 20, 7 (1980) and 20, 131 (1980). Artificial oxygen carriers and their properties in solution are described by a number of researchers. Traylor et al, "Solvent Effects on Reversible Formation and Oxidative Stability of Heme-Oxygen Complexes", J.A.C.S. 96, 5597 (1974) discloses the effect of solvent polarity on oxygenation of several heme-base complexes prepared by reduction with sodium dithionite or a mixture of Pd black and calcium hydride. Crumbliss et al, "Monomeric Cobalt-Oxygen Complexes", Science, 6, June 1969, Volume 164, pp. 1168–1170, discloses Schiff base complexes of Co(II) which form stable cobalt-oxygen species in solution instead of cobalt-oxygen-cobalt bridged complexes. Crumbless et al, "Monomeric Oxygen Adducts of N,N'-Ethylenebis (acetylacetoniminato) ligand-cobalt(III): Preparation and Properties", J.A.C.S. 92, 55 (1970), discloses a series of monomeric molecular oxygen carriers based on cobalt ligand complexes. Dufour et al, "Reaction of Indoles with Molecular Oxygen Catalyzed by Metalloporphyrins", Journal of Molecular Catalysis, 1, 277 (1980), discloses the catalysis of the oxygenation of simple, alkyl-substituted indoles by Co(II), Co(III), and Mn(III) meso-tetraphenyl-porphines wherein a ternary complex $O_2$-CoTPP-indole is formed initially. Brault et al, "Ferrous Porphyrins in Organic Solvents: I. Preparation and Coordinating Properties", Biochemistry, 13, 4591 (1974), discloses the preparation and properties of ferrous deutereporphyrin dimethyl ester and ferrous mesotetraphenylporphine in various organic solvents. Chang et al, "Kinetics of Reversible Oxygenation of Pyrroheme-N-[3-(1-imidazolyl)propyl]amide", discloses studies on the oxygenation of pyrroheme-N-[3-(1-imidazolyl)propyl]amide, i.e., a synthesized section of the myoglobin active site. Castro, "Hexa and Pentacoordinate Iron Poryhyrins", Bioinorganic Chemistry, 4, 45–65 (1974), discloses the direct synthesis of hexa and pentacoordinate iron porphyrins, i.e., the prosthetic groups for the active sites of certain cytochrome and globin heme proteins. Chang et al, "Solution Behavior of a Synthetic Myoglobin Active Site", J.A.C.S., 95, 5810 (1973), discloses studies on a synthesized section of the myoglobin active site and indicates that the oxygen binding reaction does not require the protein. Naturally occurring oxygen carriers have been chemically cross-linked and their properties described. Bonsen et al, U.S. Pat No. 4,053,590, discloses a polymerized, cross-linked, stromal-free, hemoglobin proposed to be useful as a blood substitute. Morris et al, U.S. Pat No. 4,061,736, discloses intramolecularly cross-linked, stromal-free hemoglobin. Wong, U.S. Pat. No. 4,064,118, discloses a blood substitute or extender prepared by coupling hemoglobin with a polysaccharide material. Mazur, U.S. Pat. No. 3,925,344, discloses a plasma protein substitute, i.e., an intramolecular, cross-linked hemoglobin composition.

Numerous papers have been published on immobilization of hemoglobin and its functional consequences, but not in connection with processes for efficient oxygen extraction from fluids. Vejux et al, "Photoacoustic Spectrometry of Macroporous Hemoglobin Particles", J. Opt. Soc. Am., 70, 560–562 (1980), discloses glutaraldehyde cross-linked hemoglobin and its functional properties. The preparation is described as being made up of macroporous particles. Hallaway et al, "Changes in Conformation and Function of Hemoglobin and Myoglobin Induced by Adsorption to Silica", BBRC, 86, 689–696 (1979), discloses that hemoglobin adsorbed on silica is somewhat different from hemoglobin in solution. The adsorbed form is not suitable for $O_2$ extraction from liquids. Antonini et al, "Immobilized Hemoproteins", Methods of Enzymology, 44, 538–546 (1976), discloses standard immobilization techniques as applied to hemoglobin and their functional consequences. Mention is made of hemoproteins bound to cross-linked insoluble polysaccharides such as Sephadex or Sepharose, using a pre-activation of the resin with CNBr. Rossi-Fanelli et al, "Properties of Human Hemoglobin Immobilized on Sepharose 4B", Eur. J. Biochemistry, 92, 253–259 (1978), discloses that the ability of the hemoglobin to be bound to Sepharose 4B is dependent upon the conformational state of the protein. Colosimo et al, "The Ethylisocyanate (EIC) Equilibrium of Matrix-Bound Hemoglobin", BBA, 328, 74–80 (1973), discloses Sephadex G-100, Sephadex DEAE-A50 and Sephadex CM-C50 as supports for human hemoglobin insolubilization. The paper shows that the affinity of the insolubilized protein for EIC is increased relative to that in solution. Lampe et al, "Die Bindung von Sauerstoff an tragerfixiertes Hamoglobin", Acta Biol. Med. Germ., 33, K49–K54 (1974), discloses studies on CM-Sephadex insolubilized hemoglobins. Lampe et al, "Der Einfluß der Immobilisierung von Hamoglobin auf dessen Sauerstoffindung", Acta Biol. Med. Germ., 34, 359–363 (1975), discloses studies on CM-Sephadex insolubilized hemoglobins. Pommerening et al, "Studies on the Characterization of Matrix-Bound Solubilized Human Hemoglobin", Internationales Symposium uber Struktur und Funktion der Erythrezyten (Rapoport and Jung, ed.), Berlin Akademie-Verlag Press, 179–186 (1975), discloses Sepharose-Sephadex types of insolubilization. Brunori et al, "Properties of Trout Hemoglobin Covalently Bound to a Solid Matrix", BBA, 494(2), 426–432, discloses Sepharose 4B or Sephadex G-200, activated by CNBr, to immobilize the hemoglobin. Some changes in the functional properties of the hemoglobin were found.

Various techniques for the insolubilization (or immobilization) of biological materials have been developed, though not described in conjunction with insolubilization and utilization of oxygen carriers. Stanley, U.S. Pat. No. 3,672,955, discloses a technique for the preparation of an insoluble, active enzyme, a biological catalyst, wherein an aqueous dispersion of the enzyme is emulsified with a organic polyisocyanate, mixed with a solid carrier and the volatile components are then evaporated from the mixture. Wood et al, U.S. Pat. No. 3,928,138, discloses a method of preparing a bound enzyme wherein, prior to foaming, an isocyanate-capped polyurethane is contacted with an aqueous dispersion of enzyme under foam-forming conditions, whereby polyurethane foams containing integrally bound enzyme are obtained. Unsworth et al, U.S. Pat. No. 3,928,230, discloses the encapsulation of fluids and solids by dissolving a water-insoluble polymerizable epoxy monomer in a solvent having high affinity for water; dispersing the monomer solution in water; dispersing in the so-formed aqueous dispersion the substance to be encapsulated; adding a polymerizing agent in a solvent having a higher affinity for water than for the polymerizing agent; and polymerizing until polymerization of the monomer is complete. Wood et al, U.S. Pat. No. 3,929,574, discloses an enzyme integrally bound to a foamed polyurethane prepared by, prior to foaming, contacting an isocyanate-capped polyurethane with an aqueous dispersion of enzyme under foam-forming conditions, whereby polyurethane foams containing integrally bound enzyme are obtained. Hartdegen et al, U.S. Pat. No. 4,094,744, discloses water-dispersible protein/polyurethane reaction products formed by admixing a water-dispersible, biologically-active protein and an isocyanate-capped liquid polyurethane prepolymer having a linear polyester backbone under essentially anhydrous conditions to form a solution, said protein and prepolymer reacting to form a watersoluble reaction product wherein the protein and prepolymer are bound together. Hartdegen et al, U.S. Pat. No. 4,098,645, discloses enzymes immobilized by the process of mixing the protein and an isocyanate-capped liquid polyurethane prepolymer in the absence of water; foaming the mixture by reacting it with water to form a polyurethane foam. Huper et al, U.S. Pat. No. 4,044,196, discloses proteins insolubilized using polymers containing maleic anhydride or di- and polymethacrylates. Huper et al, U.S. Pat. No. 3,871,964, discloses proteins insolubilized using polymers containing anhydride, di-methacrylate and a hydrophilic monomer.

Many of the prior art problems were overcome by the invention disclosed in U.S. Pat. Nos. 4,427,416 and 4,343,715, which disclose oxygen carriers which have been insolubilized at high concentrations by being entrapped and/or covalently linked to a polyurethane matrix or to comparable supports in states that are capable of reversible oxygen bonding and are regenerable in the event of oxidation. The material disclosed in these patents is generally known by the name "Hemosponge", since it is generally, though not necessarily, based on hemoglobin. The method and material as described in these patents are perfectly capable of extracting oxygen from various fluid environments in useful form, but the rate of extraction is less than that which may be desired for many applications which involve a high rate of oxygen use. Accordingly, there remains a need for an improved apparatus and method for the extraction and utilization of oxygen from fluids.

SUMMARY OF THE INVENTION

Accordingly, one object of the invention is to provide an apparatus capable of extracting oxygen from a fluid at a rate higher than that which has been previously available.

It is a further object of the invention to provide a system using an oxygen carrier that can be circulated between oxygen loading and unloading stations in order to simplify the cyclic nature of the oxygen loading and unloading processes.

These and other objects of the invention as will hereinafter become more readily apparent can be attained by providing a method for extracting oxygen from a fluid environment, which comprises the steps of (1) contacting a first fluid environment containing oxygen with a first surface of an oxygen permeable membrane having a first and a second surface, wherein said membrane separates said environment from an interior space of a closed container, (2) contacting a carrier fluid with said second surface of said membrane, wherein said carrier fluid is confined in said closed container and said carrier fluid contains a binding-state oxygen carrier, whereby oxygen which diffuses through said membrane binds to said carrier to give a bound oxygen complex, (3) transporting said carrier fluid containing said bound oxygen complex to a first electrode compartment of an electrochemical cell which forms a second portion of said closed container, (4) electrochemically modifying said binding-state oxygen carrier to an oxidation state having less binding affinity for oxygen, thereby releasing free oxygen into said carrier and producing a nonbinding-state oxygen carrier, (5) removing oxygen from said carrier fluid to give an oxygen-depleted carrier fluid, (6) transporting said oxygen-depleted carrier fluid containing said nonbinding-state oxygen carrier to a second electrode compartment of an electrochemical cell which forms a third portion of said closed container, and (7) electrochemically modifying said nonbinding-state oxygen carrier to said binding-state oxygen carrier. The invention may also be practiced more broadly without carrying out the oxidation and reduction steps by replacing steps (3)–(7) With the following steps: (3) transporting said carrier fluid containing said bound oxygen complex to a second portion of said closed container, (4) removing oxygen from said carrier fluid to give an oxygen-depleted carrier fluid, and (5) transporting said oxygendepleted carrier fluid into contact with said second surface of said membrane. The present invention also comprises an apparatus by which this method can be carried out, which briefly comprises a container having a gas permeable membrane which at least in part defines an inner space of said container, a carrier fluid as described above in contact with the inner surface of the membrane and means for removing oxygen from the carrier fluid so that the oxygen can be utilized for its desired purpose.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
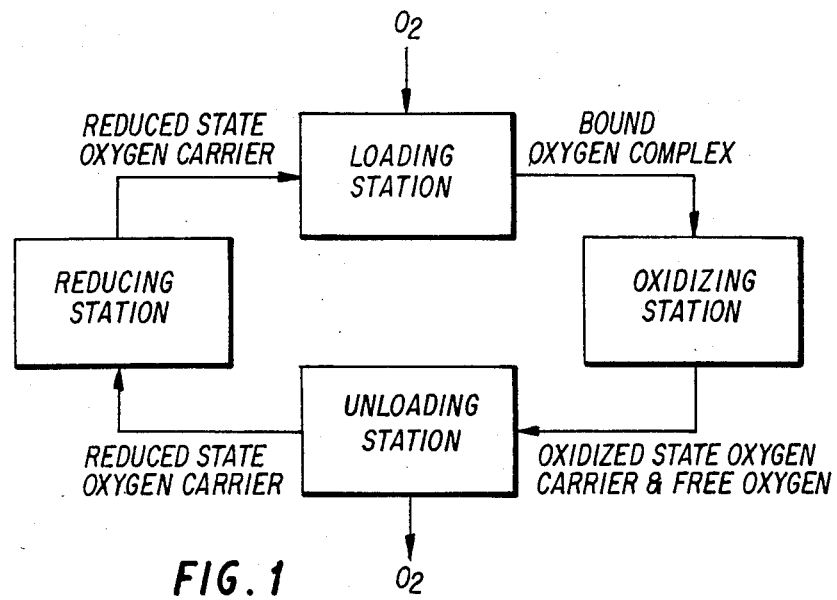
FIG. 1 is a schematic diagram of a generalized process of the invention.

The present invention provides a combination of a closed membrane system with a reversible oxygen binding compound (oxygen carrier) on the side of the membrane isolated from the environment to provide an efficient system of extracting oxygen. The oxygen binding compound is cycled loading and unloading stations that oxygen is loaded onto and unloaded from the oxygen carrier at the proper times. Other differences and advantages of the present invention are discussed later in this specification.

One key aspect of the present invention is the oxygen carrier itself. Many oxygen carriers, such as hemoglobin and the artificial oxygen carriers described in the prior art section of this disclosure, are already known and can be used in the practice of the present invention. The basic characteristic of an oxygen carrier that can be used in the practice of the present invention is the ability of the oxygen carrier to bind oxygen reversibly (references to oxygen in this application are to molecular dioxygen unless otherwise specified). Typically, the oxygen carrier is contacted with oxygen under conditions in which the carrier is not saturated so that a carrier/oxygen complex is formed, and the complex is transported to another lcoation where conditions are changed so that the carrier/oxygen complex is supersaturated, thereby releasing oxygen in the second location. After oxygen is removed from the carrier fluid used to transport the oxygen carrier, the oxygen carrier is transported back to the original location where oxygen loading again occurs. This is similar to the process tht takes place when the blood of an animal transports oxygen from the lungs or gills of an animal to its muscles where oxygen is released but differs in providing an artificial circulation system.

In the broader aspects of the invention, unloading of oxygen can be accomplished merely by reducing the pressure of oxygen at the unloading station. However, extremely favorable energy requirements have been demonstrated in a preferred embodiment of the invention which takes advantage of the different binding affinities for oxygen of various oxygen carriers that exhibit at least two oxidation states. The basic characteristics of a carrier that can be used in these preferred aspects of the invention are the existence of two oxidation states for the carrier, the ability of the carrier to be cycled between the two oxidation states by an electrochemical reaction, and different binding affinities for oxygen for the two oxidation states. Although the two oxidation states are referred to in this specification as a "binding-state" and a "nonbinding-state", these terms are relative rather than absolute. For example, if a nonbinding-state oxygen carrier has 70% of the binding capacity of the binding-state oxygen carrier, 30% of bound oxygen will be released by electrochemical cycling if the binding-state oxygen carrier is saturated with oxygen. Naturally, more oxygen will be released if there is a greater difference in oxygen affinity. Carriers having a binding capacity in the binding state at least twice that of the oxygen binding capacity of the nonbinding state are preferred. A binding/nonbinding ratio of oxygen binding capacities of 10 or more is most preferred.

The absolute binding affinity of the oxygen carrier is likewise relatively unimportant although high oxygen affinity is naturally preferred. Preferred carriers exhibit 50% saturation when in equilibrium with a partial pressure of oxygen of 0.15 atmosphere, more preferably 0.10 atmosphere, and most preferably 0.05 atmosphere. However, oxygen carriers having even lower oxygen affinities are still usable in the practice of the present invention as is well understood by those skilled in the art. For example, a binding-state oxygen carrier which is only 10% saturated will still release oxygen when its oxidation state is changed if the affinity of the nonbinding state is less than the affinity of the binding state or if equilibrium is perturbed by reducing the partial pressure of oxygen at the unloading station.

In the event that it is not self evident that a particular oxygen carrier can be used in the practice of the present invention, simple measurement of binding affinity, such as is described more fully later in this specification, for the oxidized and reduced states of the carrier will readily identify suitable carriers. As identified previously, a suitable carrier for the preferred embodiments will have two reversible oxidation states exhibiting different oxygen affinities while only one such state is necessary if there is to be no cycling between different oxidation states.

It will be readily recognized by those skilled in the art that a carrier molecule designed to bind one particular molecule in a biological system (or a synethetically produced carrier molecule) can often bind other molecules as well. For example, hemoglobin and other biologically derived oxygen-binding compounds can bind many ligands in addition to oxygen. For example, carbon monoxide, nitric oxide, oxygen, isocyanide, and nitroso-aromatics all bind to the reduced form of hemoglobin ($Fe^{2+}$). Hydroxide, cyanide, azide, fluoride, nitric oxide, acetate, and formate all bind to the oxidized form of hemoglobin and similar molecules as oxygen carriers, they are more correctly referred to as ligand carriers. Accordingly, any reference in this specification to a "oxygen carrier" or to a carrier as being a carrier of any particular ligand is not intended to specify that no other ligands can be carried by the same carrier molecule. Thus, the present invention can be used to extract other ligands from other environmental fluids (such as waste gas streams orchemical process streams).

The many known oxygen carriers can be divided into two basic groups: proteinaceous carriers (typically hemoglobin and similar compounds) and non-proteinaceous carriers. Both types are suitable for use in the present invention although proteins are relatively unstable to temperature and solvent effects and are readily destroyed by biochemical attack (bacterial contamination). However, since any apparatus used in the practice of the invention as described herein must be sealed from the external environment, a sterile internal environment can readily be maintained. Likewise, many applications do not involve extremes of temperature or contact with other solvents, and proteinaceous carriers can readily be used.

Minor problems, likewise readily overcomable, also exist with nonproteinaceous carriers. For example, heme molecules (which contain iron in the +2 oxidation state) are readily oxidized (to $Fe^{3+}$) in the absence of the protective protein portion of the hemoglobin molecule. Oxidized heme is not capable of binding oxygen. Similar considerations are true for the cytochromes and other molecules containing a porphin ring. However, since the present invention deliberately changes the oxidation state to +3 in order to release oxygen, this is not a handicap in the present system as long as the cycle time is short enough to prevent too much oxidation from occurring during the oxygen loading step, as is described in detail later.

Although some theoretical investigations have been made into the stability of oxygen-binding compounds based on porphin ring systems (see previous discussion under section entitled DESCRIPTION OF THE PRIOR ART), there has been no suggestion of using oxygen-binding molecules in a closed, fixed-volume system for extracting oxygen across a gas-permeable membrane from the environment on the other side of the membrane. It was only with the investigations of the present inventors that it became possible to provide an apparatus and a method capable of extracting oxygen from an environment surrounding the apparatus at the rate which is now possible. For example, certain preferred embodiments of the invention are capable of extracting oxygen from seawater where it is present at a concentration of about 7 parts per million (ppm) into a carrier fluid at a concentration of 860 ppm (600 ml of STP oxygen per liter of carrier fluid), a concentration 3 times that which is present in air and over 100 times that which was present in seawater.

Hemoglobin is, of course, by far the most common oxygen carrying protein found in nature. Within this context, however, it is possible to use in commercial applications any of the hemoglobins which are available in large quanity, e.g., human, bovine, procine and equine hemoglobins. Further, whole blood, lysed cells, stripped or unstripped hemolysates can be used. Modified forms of hemoglobin, i.e., high or low affinity hemoglobins, as known in the art, are also useful. Hemoglobin can be treated to manipulate its affinity. Covalent or chemical modification, prior to immobilization, or treatment of the hemoglobin with cofactors that bind tightly and alter oxygen binding affinity (these are removable by washing the polymeric matrix with appropriate buffers) can be used. Additives, like catalase, superoxide dismutase and methemoglobin reductase, can be added to the carrier solutions. These agents are normally found in red blood cells and can be useful in conferring structural and functional stability to the hemoglobin. Additionally, reagents such as glycerol, which are known to impart structural stability to proteins in solution, can be usefully added to the solution.

Although hemoglobin is by far the most common oxygen carrier found in nature, other types of oxygen carriers are found in a number of species. In particular hemocyanin and hemerythrins are known and usable although they suffer from the deficiency of being unavailable in large quantities. See, for example, Bonaventura et al, Biochemistry, 13, 4787 (1974).

Several advantages are achieved by using non-proteinaceous carriers as opposed to proteinaceous carriers such as hemoglobin. In addition to those advantages of stability previously mentioned, non-proteinaceous carriers are much smaller than hemoglobin and can therefore be packed more tightly into a fluid carrier to produce an efficient and highly concentrated oxygen extracting fluid composition. For example, when a heme molecule is used as taught herein, 20 millimolar concentrations can easily be attained which have a theoretical oxygen carrying capacity of 640 milligrams (914 milliliters at STP) of oxygen per liter of carrier fluid.

The use of synthetic oxygen carriers, such as the modified hemes and other like compounds known in the art, which show reversible oxygen binding, allow the attainment of high oxygen absorbing capacity in minimum absorber volume. Several such carriers are discussed in the section of this application entitled Description of the Prior Art.

Oxygen carriers of the invention, whether proteinaceous or non-proteinaceous, generally comprise a metal ion chelated to nitrogens of a tetradentate molecule (often butnotnecessarily cyclic). Such compounds typically have a tetraminotetra(trimethylene) structure forming at least part of the basic molecule. This can be represented by the formula

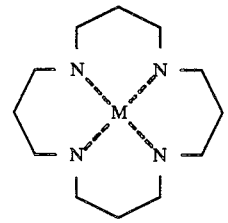

in which M represents the metal ion. Organic substituents can be present at any of the methylene carbons as long as they do not destroy the planarity of the metal binding nitrogens and any carbon-carbon or carbon-nitrogen single bond can be replaced with a double bond as long as the double bonds are not cumulative.

Two axial positions remain free in such molecules and are available to bind oxygen. However, in the absence of some additional chelating group to perform the same protective function as the proteinaceous portion of hemoglobin, the metal ion will be oxidized to a non-binding form, especially in aqueous systems. Accordingly it is often useful to provide a nitrogenous base to chelate with one side of the metal ion so that oxidation can be prevented. This can be symbolized as follows:

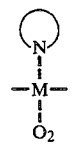

in which —M— represents a side view of the essentialy flat tetradentate chelating molecule and

represents a nitrogenous base, whose various possible structures are discussed later in detail.

Many compounds which are useful in carrying out the present invention contain a porphin ring, a metal ion chelated in the ring, and a nitrogenous base chelated to the metal ion in at least one of the two possible axial positions not occupied by the porphine nitrogens. Porphin itself is a tetrapyrrole having the following structure:

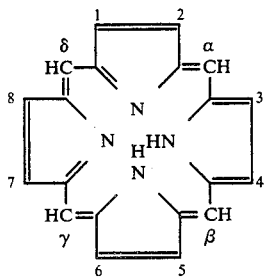

The porphin ring occurs widely in nature, particularly in compounds known as porphyrins. For example, porphyrins appear in hemoglobin, myoglobin, peroxidase, catalase, and at least 5 different cytochromes (b, c, $c_1$, a, and $a_3$). The porphyrins are well known and are named according to the side-chain substituents which are found on the pyrrole rings of the base compound. Examples of known classes of porphyrins include coproporphyrins, etioporphyrins, mesoporphyrins, and protoporphyrins. The most abundant of these in nature are the protoporphyrins. Protoporphyrins contain 2 propionic acid groups, 4 methyl groups, and 2 vinyl groups. Fifteen different isomeric forms exist, depending on the sequence of substitution. The structure of the most abundant form, protoporphyrin(IX) (found in hemoglobin, myoglobin, and most of the cytochromes), is shown below.

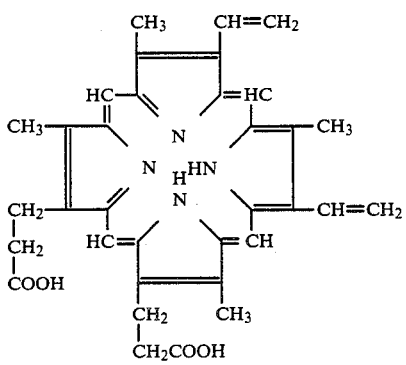

In addition to the naturally occurring porphyrin-containing molecules, synthetic porphyrin-like derivatives are also known. Several such compounds are disclosed in the prior art references previously cited. Derivatives are commonly formed by reacting one of the propionic acid side chains with a molecule that contains an amino or hydroxyl group in order to form an amide or ester link, respectively. The carboxylic acid side chains of the porphyrins also provides a convenient method of attaching these molecules to a solid support, as will be discussed later. However, functionalization of any porphyrin ring system is generally readily achieved by an organic chemist because of the reactive pyrrole rings. Thus, the number of porphyrin molecules that can be synthesized by a competent organic chemist is practically unlimited. Of these many compounds, those which are suitable for use in the present invention can be readily determined by their ability to bind oxygen. Oxygen binding is readily determined by ultraviolet spectroscopy as is well known to those skilled in the art. (See, for example, Brinigar et al, J.A.C.S. 96, 5597 (1974).) Porphyrin molecules or derivatives which are capable of forming an oxygen complex without greater than 50% oxidation after 1 hour under 0.2 atmosphere of oxygen are preferred.

Preferred porphyrin-containing compounds include porphyrins and alkyl esters of porphyrins, particularly those containing 1-4 carbon atoms per ester-forming alcohol. Also preferred are porphyrin derivatives in which a nitrogenase base is attached to a porphyrin through a carboxylic acid side chain. Such molecules generally have the formula $PCO-X-(CH_2)_y-Z$ where the PCO-portion of the molecule is derived from a porphyrin having a carboxylic acid group of the formula PCOOH, X represents NH or O, y is 2–5, and Z represents a 5- or 6-membered aromatic, saturated, or ethylinically unsaturated ring containing one or two nitrogen atoms, with the proviso that any $CH_2$ can be replaced with a nonconsecutive O or NH (i.e., two Os, two NHs, or an O and an NH cannot be adjacent). Specific examples of nitrogen-containing rings are set forth in the following discussion of "nitrogenous bases."

Protoporphyrins are particularly preferred porphyrin ring-containing structures and protoporphyrin(IX) is most preferred.

In addition to the porphyrin or similar ring, the oxygen-binding porphyrin compound will contain a metal ion capable of bonding oxygen when chelated in the ring. Typical metal ions include iron, manganese, zinc, nickel, cobalt, and copper. Iron or cobalt in the +2 oxidation state is preferred. When $Fe^{2+}$ is present in a protoporphyrin ring system, the resulting complex is called protoheme, or more simply heme.

The final component in many of the oxygen binding compounds of the invention is a nitrogenous base chelated to the metal ion in one of the axial positions that remain after the porphyrin or other ring itself has formed a square-planer complex with the central metal ion. In proteinaceous oxygen carriers the nitrogenous base is often present as part of an amino acid residue of a peptide chain, usually an imidazole ring of a histidine residue. However, free (i.e., not bound by a covalent bond) nitrogenous bases may be present in both proteinaceous and non-proteinaceous oxygen carriers and are particularly preferred for the latter. Preferred nitrogenous bases include 5- and 6-membered aromatic, saturated, and ethylinically unsaturated rings containing 1 or 2 nitrogen atoms in the ring. These compounds may be substituted by one or more, preferably one, organic substituent, preferably an alkyl group (most preferably having 1-4 carbon atoms) or an alkyl group which is itself substituted with a hydroxyl or amino group. As discussed above, compounds in which one of these nitrogen-containing rings is co-valently bound to the porphyrin ring through a carboxylic acid side-chain on the porphyrin ring are also preferred. Free (i.e., non-covalently bound) nitrogenous bases which are preferred are those in which all hydrogens on electronegative atoms have been replaced by one or more of the substituents named above in this paragraph. Imidazole and pyrrolidine derivatives having a $C_1$–$C_4$ alkyl group substituent on the N-1 are particularly preferred, with 1-methyl imidazole being most preferred.

The nitrogenous base ligand can be present when the oxygen bonding compound is added to the carrier fluid or the ligand may be present in the carrier fluid itself. In fact, the preferred embodiment of the present invention utilizes the ligand as the carrier fluid. However, other organic solvents such as hydrocarbons, chlorinated hydrocarbons, dimethylformamide, dimethylsulfoxide, alcohols, and the like, can also be used as the carrier fluid. Mixed solvent systems are also suitable. Examples of non-nitrogenous solvent systems include toluene, methylene chloride, mixed solvents containing methylene chloride and methanol, hexafluoroethylene, and the like. Aqueous solutions are also suitable, although it is essential that, when a non-proteinaceous porphyrin-like molecule is used as the carrier, a nitrogenous base is selected which is capable of strongly chelating to the metal ion in order to prevent too rapid oxidation of the essential metal ion. Such bases can readily be selected from bases described herein using the spectrophotometric technique previously discussed which readily reveals both oxidation and complex formation. Nitrogenous bases which are covalently attached to the porphin ring as described above are preferred with aqueous systems. Also preferred for use with aqueous carrier fluids are proteinaceous oxygen carriers, expecially hemoglobin.

Carrier fluids which are not miscible in water offer some advantages when oxygen is being extracted from water or an aqueous solution, such as seawater. Membranes with relatively large pores may be used to promote rapid oxygen transfer across the membrane since the two liquids will tend to stay separate and not mix in the pores. However, large pressure differences between the two surfaces of the membrane should be avoided under these circumstances to avoid forced mixing of the liquids.

Oxygen binding compounds of the invention may be free in solution or may be attached to a solid support material which is capable of circulating with the carrier fluid. For example, a carboxylate group on a porphyrin molecule may be reacted, either directly or through a divalent linking molecule, with a hydroxyl or amino group of a circulating particle, such as a finely divided polymer. Typically, a linking molecule of the formula A-L-B will be used, where A is a group capable of reacting with a functional group in the oxygen binding compound (preferably a hydroxyl or amino group when the oxygen binding compound contains a carboxylate), L is any covalently linked sequence of atoms which joins A to B and preferably comprises —$CH_2$— or para-phenylene groups or a mixture thereof which provide a separation of 5 to 50 angstroms between A and B, and B is a functional group capable of forming a bond (preferably but not necessarily a covalent bond) with the circulating particle. Examples of L include —$(CH_2)_n$— wherein n is from 1 to 20 and

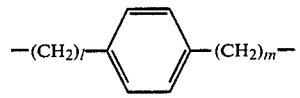

wherein 1 and m independently represent an integer from 0 to 10. B may be an amino, hydroxyl, carboxylate or other organic functional group of moderate reactivity, a functional group capable of forming a highly reactive organic functional group such as a carbene or nitrene (for example, nitrene precursors include azides from which nitrenes can be generated by photolysis), or even non-reactive portions of a molecule such as a large alkyl or aromatic hydrocarbon portion which binds tightly to a non-polar surface by hydrophobic interactions.

The circulating particle is not limited by its chemical structure as long as oxygen binding capacity (easily measured as described above) is retained for the oxygen carrier when it is attached to the circulating particle. Circulating particles can be prepared by grinding from solid polymers, glass, or other solid substrates, preferably to average diameters of 5–10$\mu$. Circulating particles as described in U.S. Pat. No. 4,427,416 can readily be adapted to the practice of other embodiments of the present invention or can be modified by replacing the hemoglobin described therein with one or more of the other oxygen binding compounds described herein.

The technology relating to the production and use of oxygen permeable membranes is well known and need not be set forth here in detail. See, for example, "Membrane Technology", Kirk-Othmer Encyclopedia of Chemical Technology, 3rd Edition, John Wiley and Sons, New York, Volume 15, pages 92–131, and the references cited therein. Certain preferred embodiments of suitable membranes are discussed here, however, in order to exemplify the invention.

The selection of a membrane for use in the present invention is not limited other than by the ability of the membrane to pass oxygen while retarding the passage of other components of the fluid environment from which the oxygen is being extracted. Since the present invention can be used to extract oxygen both from, for example, air and seawater, it will be desirable to select a membrane based on the purpose for which it will be used. Most important synthetic membranes are formed from organic polymers, and there are extensive tabulations of permeability coefficients for various gas/polymer systems now in existence. See, for example, Van Amerongen, Rubber Chem. Technol. 37, 1065 (1964); Allen et al, J. Member. Sci. 2, 153 (1977); Yasuda et al in Brandrup et al Eds., Polymer Handbook, Second Edition, John Wiley and Sons, New York, 1975, p. 111; and Bixlar et al in Sweeting, Ed., the Science and Technology of Polymer Films, Vol. II, John Wiley and Sons, New York, 1971, p. 85. In addition to oxygen permeability, inertness to the external fluid environment and the internal carrier fluid are also required. Such properties of polymers are also well known or can readily be determined by exposure of the membrane to the carrier fluid and external environment.

The physical microstructure of the membrane is not important so long as the membrane performs the function described herein. Accordingly, dense films, porous membranes, and asymmetric and composite membranes are suitable. The macroscopic form of the membrane is also relatively unimportant although hollow fibers are preferred over flat sheets or tubular membrane configurations since hollow fibers are self-supporting and thus eliminate the need for expensive support materials. In fact, hollow fiber cartridges in which a plurality of gas permeable hollow fibers are connected in parallel between two manifolds at opposite ends of each tube can readily be adapted for use in the present invention. For example, Romicon manufactures a hollow fiber cartridge 3 inches in diameter and 43 inches long containing 660 hollow fibers joined to manifolds at opposite ends of the cartridge. The hollow fibers have a surface area of 2.5 $m^2$ and volume of 647 ml and are in the form of a composite membrane with an internal silicone rubber skin formed on a polysulfone layer. The cartridge walls form a chamber around the hollow fibers through which the carrier fluid can be transported. Fluid from the environment, e.g. seawater, is transported through the inside the hollow fibers (i.e., the interior of the fibers is the outside of the closed container) where extraction of oxygen into the fluid carrier takes place.

When the environmental fluid from which oxygen is extracted is an aqueous fluid, a polymer having a high permeability to oxygen is particularly preferred because of the low oxygen pressure which exists in water. Silicone rubber, natural rubber and poly(phenylene oxide), all of which have high permeability to oxygen, are particularly preferred. Also preferred is poly(trimethylsilylpropyne), often abbreviated as PMSP. This material is described in J. Amer. Chem. Soc., 105, 7473 (1973). When oxygen is being extracted from air, high permeability is not as important. In any event, the present invention has advantages over passive diffusion systems since the partial pressure of oxygen in the carrier fluid itself is essentially zero at all times until the oxygen binding compound is saturated. Accordingly, a constant gradient across the membrane exists in practice since the oxygen bound to the carrier compound will normally be transported to a second location where the oxygen will be unloaded prior to saturation.

The individual components of an electrochemical cell used in the practice of the method of the invention are readily available to those skilled in the art although certain combinations of these components have not been previously known. For example, the electrochemical reactions themselves can be conducted in any electrochemical cell which has an anode compartment and a cathode compartment through which the appropriate fluids can be transported. For simplicity in the following discussion, it will be assumed that an oxygen carrier in which the oxygen binding state is a lower oxidation state and the nonbinding state is a higher oxidation state is being used in order to simplify discussion of anode and cathode compartments. However, it will be easily recognized that when an oxygen carrier in which the oxygen binding state is a higher oxidation state can readily be used by reversing the anode and cathode as described hereafter.

Considerable effort has gone into the design of electrochemical cells useful for conducting continuous chemical reactions, for example, cells used in the electrolysis of salt solutions to produce chlorine and sodium hydroxide. Although such cells do not represent preferred embodiments of the present invention, they can readily be adapted for use in the practice in the present invention. For example, the electrolytic cells disclosed in British Pat. No. 2,009,795 and U.S. Pat. Nos. 4,210,501, 4,214,958, and 4,217,401 can be adapted for use in the practice in the present invention by arranging for a carrier fluid containing heme to pass first into the anode chamber where the oxygen carrier is oxidized and oxygen is released (this chamber already being adapted for the collection of gas since chlorine is normally produced in this chamber) and then into the cathode chamber where the oxidized state oxygen carrier is reduced to a reduced-state oxygen carrier which is again capable of binding oxygen.

However, such electrochemical apparatuses are not readily useable in those preferred embodiments of the present invention which involve unloading of oxygen in undersea applications where the carrier fluid is under high pressure as a result of contact with seawater at depths of 10 meters or more. Under these conditions, it is preferred that the carrier fluid containing the oxygen binding compound be enclosed within a sealed system and that all oxygen transfers occur through gas permeable membranes.

Typically, an apparatus used for the extraction of oxygen from seawater will comprise an oxygen loading station as described above in which an oxygen carrier is transported past an oxygen permeable membrane in contact with the environment where oxygen is loaded onto the oxygen binding compound. A carrier fluid containing the oxygen binding compound is then transported to an oxygen unloading station through a conducting system which seals the carrier fluid from both the external seawater environment and the internal environment of the chamber into which oxygen is being released. Typically, the internal volume of the system is constant since the carrier fluid is an incompressible liquid. However, a reserve container of carrier fluid and oxygen carrier can be attached to the system through a valve so that carrier fluid lost through the membrane to the external environment can be replaced. The reduced state oxygen carrier is oxidized at the anode of an electrochemical cell, and the carrier fluid containing free dissolved or gaseous oxygen is transported to a separate location where the oxygen passes into the interior environment in which it will be consumed through an oxygen permeable membrane. The carrier fluid containing the oxidized state oxygen carrier is then circulated back through a cathode compartment of the electrochemical cell where the reduced state oxygen carrier is reformed by electrochemical reduction. The carrier fluid containing the reduced state oxygen carrier is then transported back to the oxygen loading station, after which the entire operation can be repeated.

When the invention is practiced in this manner, a key component is the oxygen permeable membrane through which oxygen is removed from the extracting apparatus. This membrane can be of the same type described above in connection with the oxygen loading station. However, since oxygen is present in the carrier fluid at a high concentration capable of rapid diffusion through the membrane, a much smaller membrane is needed than for the original oxygen extraction step itself. Typically, an oxygen unloading station designed to release gaseous oxygen into a second environment will have only about 1/5 to 1/20 the surface area of the original oxygen extracting membrane. All of the design characteristics of the membrane used at the oxygen loading station apply equally to the oxygen unloading membrane. However, it is preferred to pass the carrier fluid through the interior of hollow fibers and to collect oxygen in the space surrounding the fiber bundles.

Although, as indicated previously, the design of the electrode and cathode compartments are not critical to the practice of this invention, certain embodiments are preferred. For example, a parallel plate electrochemical cell in which anode and cathode compartments alternate in order to reduce the volume occupied is a preferred embodiment. In order to maximize contact of the carrier fluid containing the oxygen binding compound with the anode and cathode, it is preferred that the anode and cathode compartments have a thickness of no more than 5 millimeters, preferably no more than 1 millimeter. Particularly preferred are porous electrodes, such as vitreous carbon or polytetrafluoroethylene covered with a thin layer of an inert metal such as gold or platinum. The carrier fluid in such an embodiment passes through the porous electrodes, the spaces of which form the anode and cathode compartments.

In a preferred embodiment, the electrochemical cell compartments will contain an inlet and outlet in each anode and cathode compartment through which fluid can be conducted. A container is attached by means of a conduit to the outlet of the anode compartment. The conduit may be separate or may be formed entirely or in part from the walls of the container or the anode compartment. Since oxidation takes place in the anode compartment, the anode compartment when in operation will contain the carrier in the oxidized state and free oxygen in solution. When the free oxygen in solution passes through the conduit into the container, it is removed through a gas permeable membrane which forms at least one surface of the container. Since all oxygen is released by the electrochemical oxidation of the carrier, an extremely high concentration of oxygen can exist in the carrier fluid. Accordingly, a positive gradient across the gas permeable membrane can exist even if air or oxygen is present on the opposite side of the membrane. It is only necessary that the partial pressure of oxygen be lower in the chamber where oxygen is being collected for use than it is in the fluid inside the container. This is the meaning of the phrase "low partial pressure of oxygen" as used with respect to the oxygen unloading step of the invention.

The fluid is then transported through a second conduit attached to the container so that fluid which enters the container from the anode compartment contacts the membrane prior to exiting the container through the second conduit. This second conduit is attached to an inlet in the cathode compartment and can be formed in the same manner as the first conduit described above. The cathode compartment also contains an outlet through which the fluid passes on its way to pick up oxygen from the environment.

Since oxygen is generally being produced for consumption, it is relatively easy to maintain a low partial pressure of oxygen on the gas-collecting side of the container membrane. If this oxygen is consumed by a human, animal, or fuel burning engine, the result is the same: reduction of the partial pressure of oxygen on the oxygen consuming side of the membrane, which maintains the pressure gradient and the high rate of oxygen removal from the system.

Of course, it is possible to consume the oxygen without isolating the oxygen in gaseous form. Oxygen in the carrier fluid may be transported to a fuel cell where the oxygen is consumed directly. In a preferred embodiment of the invention, the anode compartment is itself part of the energy generating fuel cell as well as being a place where oxygen is released from the carrier so that no transportation is required.

Fuel cells are of course well known and can easily be adapted to the process of the present invention. See, for example, U.S. Pat. Nos. 4,215,182; 4,075,396; and McDougall, Fuel Cells, John Wiley & Sons, New York (1976). The last-named reference is a comprehensive discussion of fuel cells available in the scientific library of the United States Patent & Trademark Office.

It has been determined that an electrochemical unloading system will use only a small quantity of the energy that is available from oxygen which is extracted by the system. This calculation is shown below.

Electrochemical Loading/Unloading Calculations (1) Loading will be preceded by a reduction of the carrier.

(2) Unloading will be preceded by an oxidation of the carrier, lowering its affinity for $O_2$.

(3) The difference in potential required between the anode (oxid) and cathode (red) is found from:

$$E_{tot} = E_{thermodynamic} + E_{iR} \text{ (Joulean)} + E_{kinetic\ overpotential}$$

$E_{thermodynamic}$=Potential determined by the Nernst relationship:

$$E_{sol} = E^{0'} - \frac{RT}{nF} \ln \frac{R}{O}$$

Assume 50% load/unload cycle. The R/O ratio must change from 3:1 to 1:3

$R = 1.987$ cal/M °K.

$T = 298°$ K.

$F = 23,060$ cal/Volt $E_a = E° + 0.028$ V $E_c = E° - 0.028$ V $E_{thermo} = E_a - E_c = 56$ mV $E_{iR}$=Potential determined by solution resistance and current requirements $R$ = Specific resistance * electrode separation/unit area = 9.7 ohm-cm * 0.1 cm/1.0 cm$^2$ = 0.97 ohm (in a 1 cm$^2$ area)

i=10 mA/cm$^2$ (this value will be determined largely by mass transfer properties of the cell—flow rates, ultrasonics, etc.—but this is a value roughly 0.05 of that used by fuel cells and other bulk electrolytic processes)

$E_{iR} = 0.010\ A * 0.97$ ohm $= 0.0097$ V (9.7 mV)

$E_{kinetic\ overpotential}$ is very small. The exchange current and Heterogeneous electron transfer rate constant for heme in 1-methylimidazole at a gold electrode are very large. ($k_h°' = 1.57 \times 10^1$ cm/sec) This term can be ignored.

$E_{tot} = 56$ mV $+ 9.7$ mV $= 66$ mV to be applied across the electrodes.

Power consumption for the load/unload cycle:

$P = E * i$ $= 0.066 \text{ V} * 0.010 \text{ A}$

= 0.00066 watt per cm$^2$ of electrode surface area to produce O$_2$. This counts both the loading and unloading sides of the electrochemical process.

1.0 cm$^2$ of electrode surface area produces:

$$\frac{0.010 \text{ A}}{1.0 \text{ cm}^2} \times \frac{1.0 \text{ coul/sec}}{1.0 \text{ A}} \times \frac{1 \text{ mole e}^-}{96500 \text{ coul}} \times \frac{1 \text{ mole O}_2}{1 \text{ mole e}^-} \times$$

$$\frac{22.4 \text{ l O}_2}{1 \text{ mole O}_2} \times \frac{60 \text{ sec}}{1 \text{ min}} = 0.00014 \frac{\text{l O}_2}{\text{min}}$$

Therefore, the power required to electrochemically modulate the carrier to transfer O$_2$ is: 4.7 watts per liter of O$_2$ per minute. Thus, even with less than 50% efficiency of the entire transfer, there will be no more than 10 watts/l O$_2$ per min required.

As shown by these calculations, it is possible to carry out the redox process on the oxygen carrier directly without the intervention of any modifier, promoter, linker, or mediator. However, such materials may be included if desired. A mediator is a small molecule also present in a circulating carrier fluid which serves to transport charge from the electrode surface to the oxygen carrier. A modifier or promoter is a molecule attached to the electrode surface which facilitates electron transfer without itself undergoing a redox reaction. A linker is a molecule which binds the carrier to the electrode surface where the redox process can take place.

The invention will now be described with reference to certain preferred embodiments shown in the Figures.

FIG. 1 shows in schematic form four essential operations of a preferred method or apparatus of the invention along with the form of the oxygen carrier which exists after each step. If the invention is being practiced in its broadest manner (i.e., no oxidation or reduction of the carrier), only the loading and unloading stations will be present, and the carrier will cycle between them. The oxygen carrier used to illustrate the invention in FIG. 1 has a reduced oxygen-binding state and an oxidized nonbinding state. The four stations and any conduits which may be necessary to connect them are isolated from the environment from which oxygen is being extracted except for contact with this external environment through a gas permeable membrane (not shown) at the loading station. Circulating into the loading station is the reduced state oxygen carrier in the carrier fluid. The reduced state oxygen carrier is capable of binding oxygen, so that any oxygen which diffuses through the gas permeable membrane at the loading station becomes bound to the oxygen carrier. The thus-formed bound oxygen complex in the carrier fluid is then transported to an oxidizing station where the reduced-state oxygen carrier is electrochemically oxidized to an oxidized-state oxygen carrier, thereby releasing free oxygen into the carrier fluid. The carrier fluid containing the oxidized state oxygen carrier and the free oxygen is then transported to an unloading station where free oxygen is removed. Alternately, the oxidizing station and the unloading station may be physically located in the same area when the oxygen is to be consumed by a fuel cell. When gaseous oxygen is the desired end product, the unloading station is generally physically separated from the oxidizing station. When gaseous oxygen is being produced at the unloading station, it will pass from the carrier fluid into the environment in which the oxygen is to be utilized through a gas permeable membrane, a valve, or some other device which isolates the carrier fluid from the oxygen utilizing space. After all or part of the free oxygen has been removed from the carrier fluid, the carrier fluid containing the oxidized-state oxygen carrier is then transported to a reducing station where the oxygen carrier is reconverted into its original reduced state. The reduced-state oxygen carrier is then ready for transport back to the loading station where the cycle can be repeated, as will normally be desired.

Figure 2:
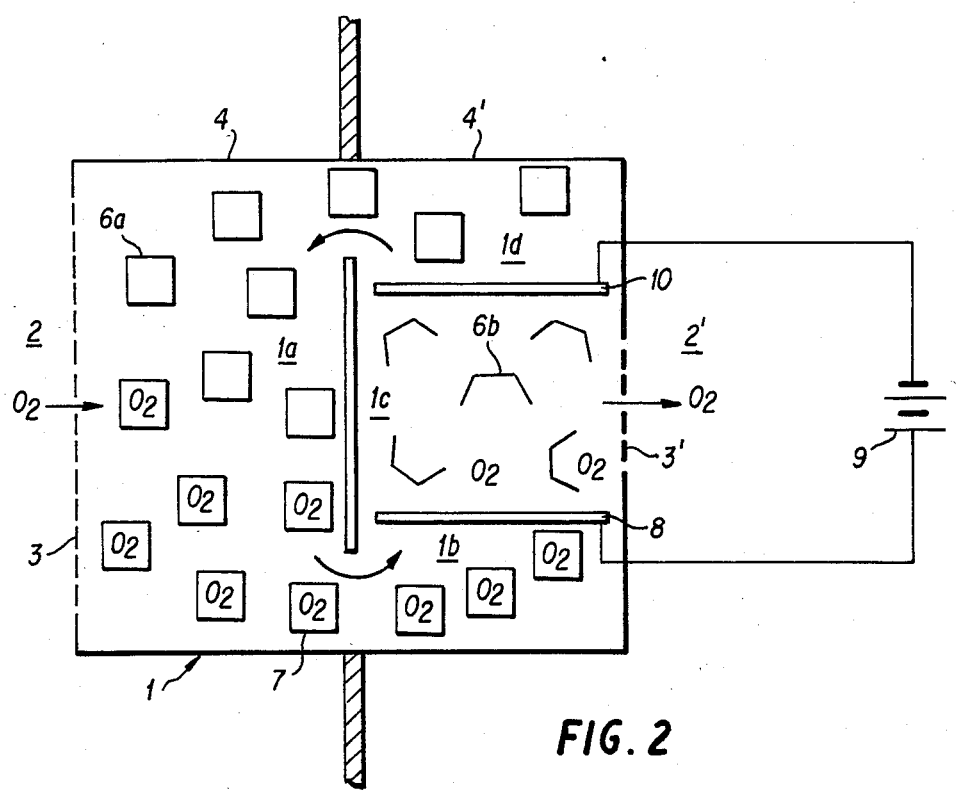
FIG. 2 is a schematic diagram of an embodiment of an oxygen extraction apparatus showing the operation of an electrochemical oxygen unloading system.

FIG. 2 shows in schematic form the operation of a generalized apparatus of the present invention in which oxygen is released in gaseous form. The apparatus comprises a container 1 which isolates the interior of the container from contact with fluid environment 2 from which oxygen is being extracted and fluid environment 2' into which oxygen is being released. Oxygen enters container 1 through gas permeable membrane 3 and exits container 1 through gas permeable membrane 3'. Inside container 1 is a carrier fluid 5 which contains oxygen binding compound 6 either in reduced form (6a) or oxidized form (6b) depending on its location within the container. Carrier fluid 5 containing reduced state oxygen carrier 6a enters the portion of the container 1 which forms oxygen loading station 1a. Oxygen which passes through membrane 3 binds with oxygen carrier 6a to form a bound oxygen complex 7 which is then transported along with carrier fluid 5 to oxidizing station 1b. In oxidizing station 1b complex 7 contacts anode 8 which is given a positive electrochemical potential by battery 9. Contact of bound oxygen complex 7 with anode 8 produced oxidized state oxygen carrier 6b and free oxygen, both of which are transported along with carrier fluid 5 to that portion of container 1 which comprises unloading station 1c where oxygen diffuses into environment 2' through membrane 3'. Carrier fluid 5 then transports oxidized state oxygen carrier 6b into that portion of container 1 which comprises reducing station 1d. Contact of oxidized state oxygen carrier 6b with cathode 10, which has been given a negative electrochemical potential by battery 9, converts oxidized state oxygen carrier 6b into reduced state oxygen carrier 6a. Carrier fluid 5 containing reduced state oxygen carrier 6a is then transported back to loading station 1a after which the cycle can be repeated.

Figure 3:
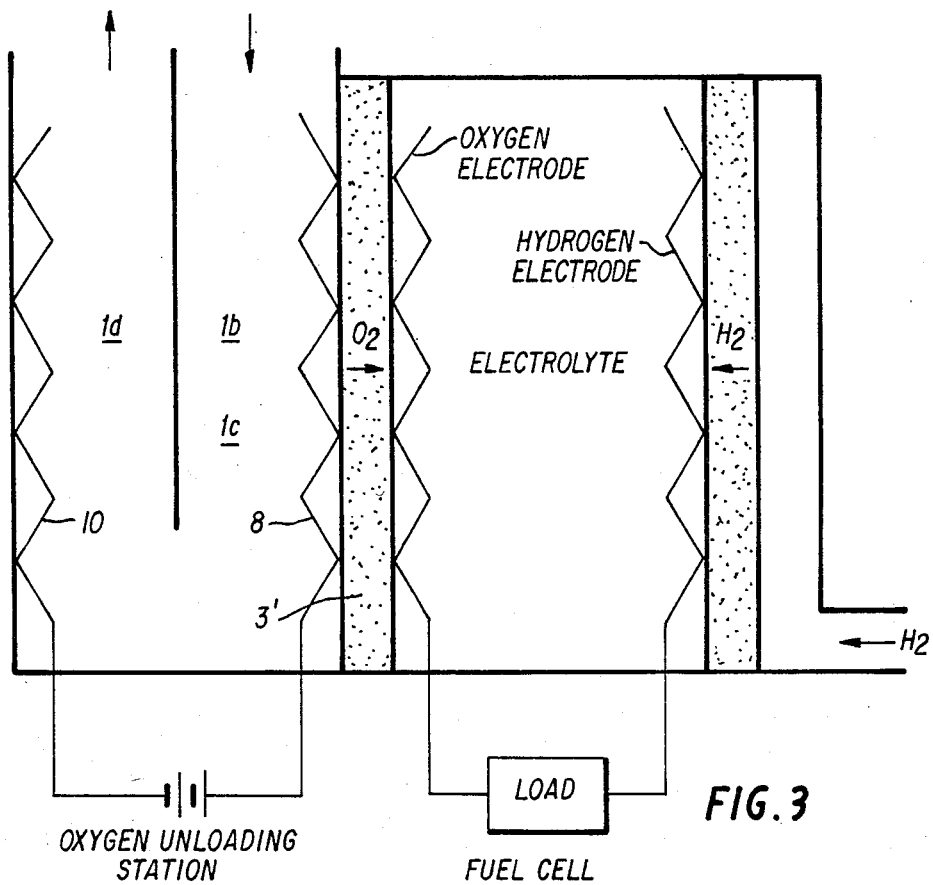
FIG. 3 is a schematic diagram of a preferred embodiment of the invention in which extracted oxygen is consumed in a fuel cell.

FIG. 3 shows a schematic diagram of an embodiment of the invention in which oxygen is directly utilized in a fuel cell without release of the oxygen in gaseous form. Only that part of the apparatus which is different from the apparatus shown in FIG. 2 is shown in FIG. 3. Oxygen loading station 1a is accordingly not shown. Carrier fluid is transported in the direction of the arrows. When carrier fluid containing the bound oxygen complex (not shown) enters anode compartment (oxidizing station) 1b, oxygen carrier 6a (not shown) is oxidized to nonbinding oxidized state oxygen carrier 6b (not shown) by contact with anode 8. Free oxygen is then transported directly through membrane 3' into the adjoining fuel cell. In the embodiment shown, the oxygen electrode of the fuel cell is attached directly to membrane 3' to expedite oxygen diffusion. The fuel cell is an otherwise conventional fuel cell comprising an electrolyte, a hydrogen electrode, and a source of hydrogen. Since membrane 3' is directly attached to anode 8, oxidizing station 1b and oxygen unloading station 1c are in the same physical location. Carrier fluid 5 transports oxidized state oxygen carrier 6b (not shown) to reducing station 1d where reduced state oxygen carrier 6a (not shown) is formed by contact with cathode 10 identically as in FIG. 2.

Figure 4:
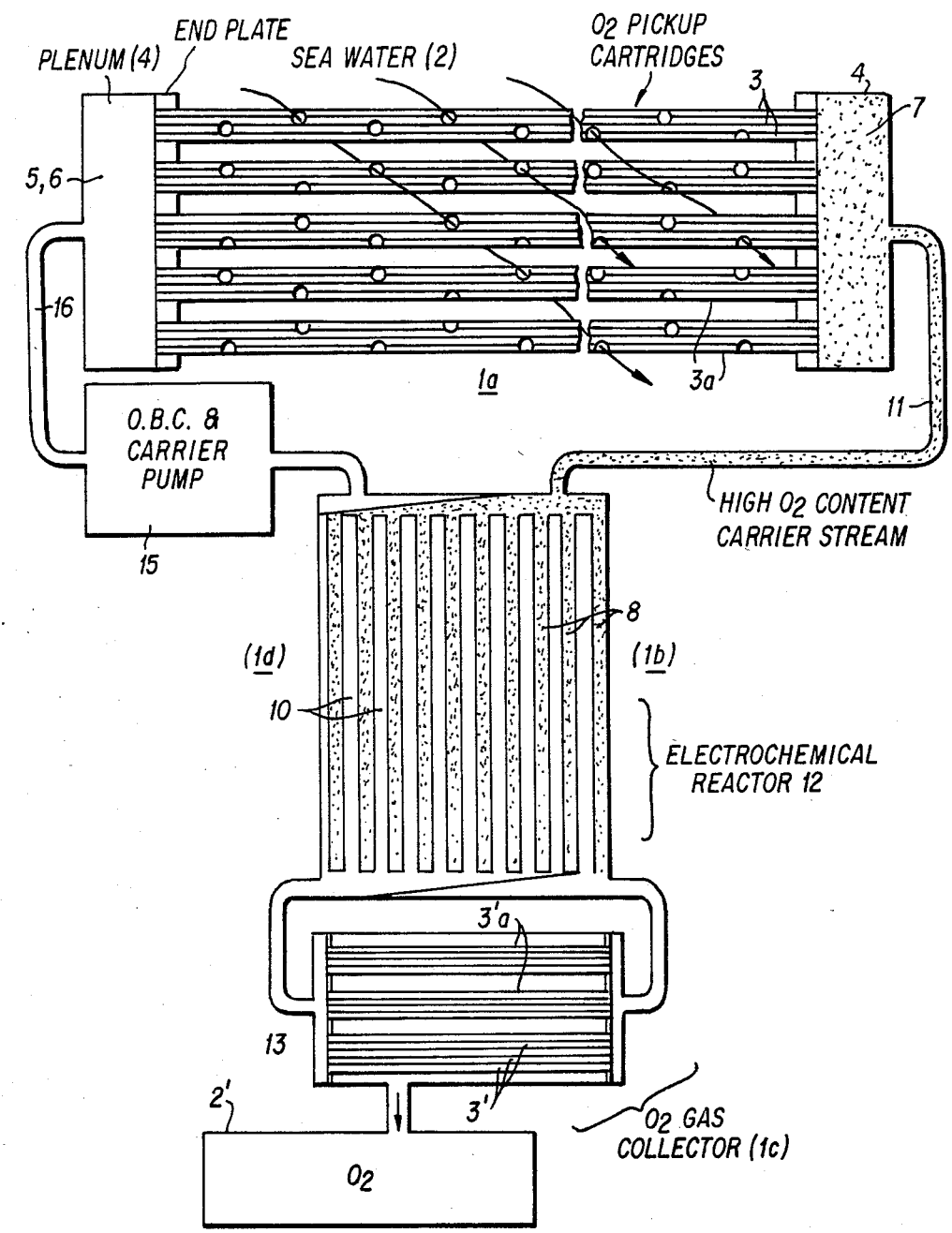
FIG. 4 is a schematic diagram of a preferred embodiment of the invention in which extracted oxygen is released in gaseous form through an oxygen permeable membrane.

FIG. 4 shows a schematic diagram of a particularly preferred embodiment of the invention using a hollow fiber cartridge 1a as an oxygen loading station, an electrochemical reactor comprising anode and cathode compartments which respectively define oxidizing station 1b and reducing station 1d, and a second hollow fiber cartridge 1c as an oxygen unloading station. The two hollow fiber cartridges and the electrochemical reactor, together with conduits which connect them and a pump which provides motive force to carrier fluid 5 together comprise container 1. Hollow fiber cartridge 1a comprises oxygen permeable membrane 3 in the form of bundles of hollow fibers (3a). Seawater from the environment (2) is flowed around the hollow fibers while carrier fluid 5 containing oxygen binding compound 6 (not shown) passes through the interior of the hollow fibers. In another preferred embodiment (not shown), seawater passes through the interior of the hollow fibers while the carrier fluid contacts the hollow fibers on their outer surfaces. The oxygen binding compound binds oxygen from seawater to form a complex 7 which is isolated from the seawater environment by the gas impermeable plenums 4 (manifolds) into which one end of each hollow fiber is inserted. Complex 7 is transported through conduit 11 to an electrochemical reactor 12 where the oxygen carrier is oxidized at anode 8 and releases oxygen into carrier 5. Free oxygen in carrier 5 then passes to unloading station 1c, which in this preferred embodiment consists of a smaller hollow fiber cartridge having gas impermeable plenums 4 connected to hollow fiber bundles 3'a, where free oxygen in carrier fluid 5 passes through 9 as permeable membrane 3' into gas collecting space 13 which is in contact with the environment 2' into which oxygen is being released. Carrier fluid 5 containing oxygen binding compound 6b (not shown) in its oxidized form is then passed back through the electrochemical reactor 12 where reduction takes place at cathode 10, making the oxygen binding compound ready to bind oxygen again. Carrier fluid 5 is then transported by means of a pump 15 through conduit 16 back to oxygen loading station 1a where the process is repeated.

Although the apparatus of the invention as described herein comprises a combination of a membrane-containing chamber, a carrier fluid, and an oxygen binding compound, it will be readily recognized that each of these individual components can be supplied separately for assembly into a working unit by the ultimate user of the apparatus. For example, the membrane-containing chamber can be manufactured and shipped separately from the chemicals which form the carrier fluid and oxygen binding compound. In fact, this is a preferred method for storage of the individual parts since it minimizes leakage through the membrane and deterioration of the oxygen binding compound itself.

The apparatus and method of the invention can be used in any application where it is desirable to remove oxygen from one location and concentrate it in a second location. For example, there are many applications in which the oxygen is present as a contaminant in a fluid, and removal of oxygen therefrom is desired. For example, oxygen degrades food products such as beer, wine, and orange juice, and removal of oxygen from these fluids greatly enhances the shelf storage life of the commodity.

In other applications, it is desirable to increase the concentration of oxygen above that which is present in a given environment. For example, persons afflicted with lung disorders who require a high concentration of oxygen for ease of breathing are now mostly limited to bottled oxygen, and movement of such persons is accordingly severely restricted. Recently, some portable units for producing oxygen-enriched air for medical uses have been marketed (Passwater et al, Am. Lab. 3,21 (1971)). An oxygen extractor of the type described herein can readily replace these units which rely on membranes alone to provide oxygen-enriched air. Portable units of the invention, powered by batteries, can also be used to increase oxygen concentration in mines and in other locations where the oxygen content of air is less than that required to support human life. In fact, the process of the present invention provides a viable alternative to the liquification and distillation processes by which oxygen is now generally obtained from air since the energy cost of extracting oxygen from air is less than that of liquification. One preferred embodiment uses a single state oxygen carrier for this aspect of the invention and accomplishes unloading by connecting the inlet of a compresser (which thus draws a partial vacuum) to the oxygen unloading station. Reduction of the partial pressure of oxygen results in release of oxygen from the oxygen carrier without requiring oxidation or reduction by an electrochemical cell.

Oxygen may also be extracted from water using the apparatus and method of the invention. Typical applications include supplying oxygen to free-swimming divers, to divers in submersible vehicles, to fuel cells which operate under water, and to various energy producing engines which require oxygen for combustion processes.

In all of these applications, electrochemical unloading and recycling of oxygen carriers provides an energy efficient means for utilizing oxygen carriers dissolved or suspended in carrier fluids. Calculations indicate that two square meters of electrode surface are sufficient to both oxidize and reduce oxygen carriers which are described herein (particularly the preferred heme/1-methylimidazole carrier) at a rate sufficient to supply oxygen to a 10 Kw internal combustion engine. The electrodes could be packed into two liters of space in the form of reticulated vitreous carbon. It is estimated that less than 10% of the energy that could be produced from the oxygen released by such a system would be required to run the redox systems in both directions.

In a particularly preferred embodiment of the invention, the oxygen extraction system of the invention can be used in combination with a system for removing carbon dioxide from the environment into which the oxygen is being released. For example, carbon dioxide is produced when the oxygen is used in the combustion of hydrocarbons burned in an internal combustion engine or by food being metabolized in a human or animal body.

Various methods for dealing with carbon dioxide produced in closed systems have previously been proposed. The simplest alternative is to exhaust combustion products to the outside environment. However, this requires a replacement of oxygen which is necessary for life support or combustion since only a small fraction of the oxygen in exhaust gas is consumed by most combustion processes. Additionally, exhaustion of gases against pressure such as would be present in undersea applications requires pressure-volume work (energy consumption) which increases rapidly with depth, thereby rendering such exhaust processes energy inefficient.

Carbon dioxide can be dissolved in water where it undergoes a reaction to form carbonic acid which then dissociates to a bicarbonate ion and a hydrogen ion. These reactions are summarized in the following equation:

$$CO_2 + H_2O = H_2CO_3$$

$$H_2CO_3 = HCO_3^- + H^+$$

Although considerable carbon dioxide can be dissolved in water in this fashion, the dissolution process is relatively slow, particularly when the concentration of bicarbonate ion builds up, and the reverse reaction shown in the second equation becomes significant. One solution to this problem is to include a base in the aqueous solution which is absorbing the carbon dioxide so that the carbonic acid reacts with the base in an essentially irreversible fashion. For example, aqueous sodium hydroxide can be used in the manner shown in the following equation:

$$H_2CO_3 + NaOH_{(aq)} \rightarrow Na^+_{(aq)} + HCO_3^-_{(aq)} + H_2O$$

Formation of water drives this reaction to the right with the result that carbonic acid does not accumulate and thereby slow down the rate of the initial dissolution process. Such a system requires the use of a chemical reagent (the base) which is used once and discarded and therefore requires a reservoir of the chemical reagent if carbon dioxide removal is to be effected over a long period of time.

The enzyme carbonic anhydrase, which can be used in the practice of these preferred embodiments the present invention, was known prior to this development but had not been proposed for use in combination with an oxygen extractor as described herein. For example, the kinetics of carbonic anhydrase and its ability to increase the permeability of carbon dioxide through membranes was described in a doctoral dissertation of Terrence L. Donaldson at the University of Pennsylvania in 1974 (available from Xerox Univ. Microfilms, Ann Arbor, Michigan, order No. 75-2721). However, the dissertation was directed to the technique of immobilizing enzymes which have a rapid turnover number, such as carbonic anhydrase, in a membrane in order to experimentally determine rate constants for reactions having half-times well under a millisecond and was not directed to the removal of carbon dioxide from fluids.

Because of its ready availability and high reactivity, carbonic anhydrase has been used as a model enzyme in many studies. For example, Eckman et al in J. Pharm. Sci. 67, 693–696 (1978), discloses immobilizing a suspension of carbonic anhydrase in microparticles having relatively large pores as a means for enzyme immobilization in general. Columns of immobilized carbonic anhydrase have also been proposed in a technique of generalized affinity chromotography relying on the affinity of carbonic anhydrase for sulfonamide derivatives. See, for example, Horowitz et al, J. Am. Chem. Soc. 100, 4632–4633 (1978).

Carbonic anhydrase has also been proposed for use in facilitating the transport of carbon dioxide across membranes, as mentioned in the dissertation described above. Examples of publications which describe this application include Broun et al, Biomed. Appl. Immobilized enzymes proteins 1, 401–413 (1977); Quinn et al, Biophys. Physiol. carbon dioxide, Symp. 1979, 23–35 (1980). Carbonic anhydrase has also been used in combination with immobilized urease to remove urea from blood as described in Funakubo, Japanese Patent No. 82:192,561. Membrane-bound carbonic anhydrase and other immobilized forms of this enzyme have also been disclosed in various U.S. patents including U.S. Pat. Nos. 4,092,219; 4,066,512; 4,004,979; 3,977,941; 3,954,678; 3,933,588; 3,910,780; and 3,905,923. Of particular interest in U.S. Pat. No. 3,910,780 which describes enhanced transport of carbon dioxide in a rebreather-type underwater breathing apparatus.

Enzyme reactors can be produced using immobilized carbonic anhydrase, and it is possible to remove carbon dioxide from a closed environment, such as one which is being supplied with oxygen by an apparatus of the invention, using such an enzyme reactor. When a fluid containing carbon dioxide is contacted with an immobilized carbonic anhydrase enzyme and water, an aqueous solution of carbonic acid is formed. The aqueous solution can then be separated and either stored or released to the environment with minimum waste of energy.

Carbonic anhydrase (CA) is present in high concentrations in the erythrocytes of all mammals. In most mammals two isozymes, CAI and CAII, are present. The two enzymes differ in catalytic properties; CAII has a ten-fold higher activity toward $CO_2$. Its turnover number of $36 \times 10^6$ mol/min makes it one of the most efficient enzyme catalysts known. A comparison of enzyme turnover numbers is shown in Table 1 below.

TABLE 1

| COMPARISON OF ENZYME TURNOVER NUMBERS | |
|---|---|
| Enzyme | Molecular Activity (turnover number) |
| CARBONIC ANHYDRASE II | 36,000,000 |
| $\Delta^5$-3-ketosteroid isomerase | 17,000,000 |
| Catalase | 5,600,000 |
| $\beta$ Amylase | 1,100,000 |
| $\beta$ Galactosidase | 12,500 |
| Phosphoglucomutase | 1,840 |
| Succinic Dehydrogenase | 1,150 |

CAII is monomeric with a molecular weight of 30,000 and requires no external cofactors for activity. Because it lacks cysteine side chains, it is not sensitive to oxidation under mild conditions and is not inhibited by heavy metals in the concentrations generally found in nature. CAII is exceptionally stable, retaining activity for weeks in solution at temperatures up to 50° C. Since immobilization of enzymes almost invariably increases their thermal stability, CAII absorbed on a polyurethane-foam sponge or immobilized in other fashion will be able to withstand rather harsh environments. The enzyme maintains favorable kinetic properties over a wide pH range and is physically stable over the pH range of 4 to 10 in aqueous solution.

Primary requirements for the use of immobilized carbonic anhydrase reactors as exhaust gas disposal units are that: (a) the enzyme be amenable to insolubilization with high yield and high retention of activity, (b) the insolubilized enzyme be capable of being utilized through an extended period of cyclic use with retention of activity, and (c) the system be resistant during long storage periods and active over a wide range of ambient temperature. Studies using laboratory-scale tests have indicated that immobilized carbonic anhydrase isoenzymes meet these criteria. Immobilized carbonic anhydrase retained its activity, was efficient over a broad temperature range, and had exception stability. Using larger-scale reactors, carbon dioxide can efficiently be extracted from fluids, for example exhaust fluids from underwater combustion engines, in a time- and energy-efficient manner.

Carbonic anhydrase catalyzes the reversible hydration of carbon dioxide to carbonic acid. Thus, the reactions catalyzed by this enzyme are similar to those shown relating to the direct dissolution of carbon dioxide in water. However, the rate of reaction in the presence of carbonic anhydrase is extremely fast, thereby providing a rapid and efficient manner of removing carbon dioxide from fluids of all types. The fluid may be either a liquid or a gas. When carbon dioxide is being extracted from a liquid, it is preferred to contact the liquid stream with a membrane which divides the liquid stream from an aqueous solution which is in contact with the immobilized enzyme. Such an arrangement is considered to involve "contact" between the enzyme and the fluid from which carbon dioxide is being removed for the purposes of this invention. It is also possible to attach the enzyme directly to or entrap the enzyme in the membrane which separates the fluid and aqueous phases. Inclusion of carbonic anhydrase in or on the membrane allows more rapid passage of carbon dioxide across the membrane. Use of a membrane allows easy separation of the fluid and the aqueous phase since the membrane prevents them from intermingling.

However, when the fluid is a gas or an immisible liquid, countercurrent flow of water and the fluid through a porous substrate in which the enzyme is trapped or to which the enzyme is covalently attached is also suitable. For example, water utilized in the reaction can be allowed to seep downward through a vertical column containing the enzyme immobilized on a porous support while a gas stream which is being stripped of carbon dioxide is bubbled upward through the same support. The aqueous solution containing dissolved carbonic acid is then removed from the bottom of the column while the gaseous fluid from which carbon dioxide has been removed is obtained at the top of the column. Water-immiscible fluids less dense than water can be stripped of carbon dioxide in a similar manner. Water-immiscible fluids more dense than water would be injected into a reactor above the water-injection point, and water would be removed at the top of the reactor while the fluid water removed at the bottom. Designs of apparatus for contacting and separating immiscible fluids are well known and can be varied easily as is necessary to accomplish the goals of this invention using the guidelines set forth in this application. Nonetheless, extraction of carbon dioxide through a gas permeable membrane remains a preferred embodiment since the fluids can be separated with greater ease.

The technology relating to the production and use of gas permeable membranes is well known and is discussed above. The selection of a membrane for use in the present invention is not limited other than by the ability of the membrane to pass carbon dioxide while retarding the passage of other components of the fluid environment from which the carbon dioxide is being extracted.

In a preferred embodiment of the invention, carbonic anhydrase is immobilized on a surface or entrapped within the gas permiable membrane itself. Various methods for entrapping or otherwise immobilizing carbonic anhydrase in membranes are disclosed in the prior art references discussed immediately above and in the section of the application entitled Description of the Prior Art. Immobilized carbonic anhydrase retained 75% or more of its homogeneus activity. The membrane preparations were stable over periods of at least 3 to 4 weeks. Permeability increases of 50-fold compared to the permeability of molecular carbon dioxide were observed at high enzyme concentrations in the membrane. Immobilized coatings of carbonic anhydrase on a silicone membrane are particularly preferred with this aspect of the invention. Although it is possible to carry out this action using only enzyme bound membranes, it is preferred to incorporate additional immobilized enzyme into the reaction zone in order to increase the rate of reaction and reduce the volume occupied by the enzyme reactor.

The term "carbonic anhydrase" refers to any carbon dioxide hydrating enzyme obtained from the blood or tissue of an animal or to any such enzyme which has been chemically modified while retaining its ability to hydrate carbon dioxide into carbonic acid. Preferred are carbonic anhydrase enzymes obtained from animal blood. Because of the ready availability of blood from livestock animals slaughtered for meat, such blood is a preferred source of enzymes. The following general procedure can readily be adapted to the isolation of carbonic anhydrase from any animal blood.

The predominant form of carbonic anhydrase in cattle blood is CAII. Since bovine CAII is inhibited by aromatic sulfonamides, sulfonamide binding provides a simple, specific method for purifying the enzyme from cattle blood. Because of the stability of the enzyme, it is unnecessary to provide special collection and storage conditions for the blood.

For isolation from bovine erythrocytes, the red cells are lysed with two volumes of distilled water adjusted to pH 6 and centrifuged to remove stroma. The stroma-free lysate is dialysed against distilled water, adjusted to pH 9, and pumped through a column of p-[(2,4-diaminophenyl)azo]benzenesulfonamide-Sephadex equilibrated with 0.1M Tris-sulfate 0.2M sodium sulfate, pH 9.0. Non-specifically-bound protein is eluted with the same buffer; CAII is eluted with 0.2M potassium cyanide (KCN). The procedure is derived from that of Osborne and Tashian, Anal. Biochem. and Biophys. 196, 501 (1979). An enzyme yield of 0.5 to 1.0 g/liter of blood is usually obtained. A similar purification procedure is applicable to CAII extracted from flash-dried blood. No major difficulties should occur in scaling up this exceptionally effective and simple procedure for large-volume enzyme production.

The high turnover rate of carbonic anhydrase allows this enzyme to be immobilized without worry as to the efficiency of the immobilization process. For example, if an organic bridging group having two reactive functional groups, one of which is reactive with the support material onto which the enzyme is to be immobilized and the other of which is a highly reactive group or which is capable of producing a highly reactive group upon irradiation or other treatment and is therefore capable of attaching to the enzyme at any carbon-hydrogen bond, is used to attach the enzyme to a substrate, attachment will be effective even if less than 1/100 of 1% of the carbonic anhydrase molecules retained their activity. With the use of even moderate planning based on the considerable knowledge available to those skilled in the art of enzyme immobilization, efficiency of attachment without activation should greatly exceed 1%. Typically, a linking molecule of the formula A-L-B will be used, where A is a group capable of reacting with a functional group in carbonic anhydrase, L is any covalently linked sequence of atoms which joins A to B and preferebly comprises —$CH_2$— or para-phenylene groups or a mixture thereof which provide a separation of 5 to 50 angstroms between A and B, and B is a functional group capable of forming a bond (preferably but not necessarily a covalent bond) with the solid support. Examples of L include —$(CH_2)_n$— wherein n is from 1 to 20 and

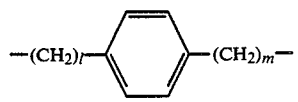

wherein l and m independently represent an integer from 0 to 10. B may be an amino, hydroxyl, carboxylate or other organic functional group of moderate reactivity, a functional group capable of forming a highly reactive organic functional group such as a carbene or nitrene (for example, nitrene precursors include azides from which nitrenes can be generated by photolysis), or even nonreactive portions of a molecular such as a large alkyl or aromatic hydrocarbon portion which binds tightly to a non-polar surface by hydrophobic interactions.

Other immobilization methods, such as entrapment of the enzyme in a porous substrate, are known to have even greater retention of activity. For example, the enzyme of the present invention could be incorporated into and immobilized with a polyurethane foam such as that described in U.S. Pat. No. 4,427,416. If one assumes 50% retention of enzymatic activity upon mobilization in such a trapping-foam material (a conservative estimate for the material described in the patent), then 1 gram ($3.3 \times 10^{-5}$ moles) of carbonic anhydrase II, with a turnover number of $3.7 \times 10^7$ moles of carbon dioxide per mole of enzyme per minute, would have the capacity to hydrate $1.2 \times 10^3$ moles of carbon dioxide per minute. This is 52,800 times its own weight of carbon dioxide. Since an internal combustion engine produces approximately 0.08 moles of carbon dioxide per kilowatt per minute, 1 gram of CAII contains more than enough enzyme to convert the carbon dioxide from a 1-kilowatt engine into bicarbonate. In fact, 1 milligram of enzyme should have sufficient capacity for this purpose. The following sample calculations further illustrate the capacity of carbonic anhydrase for converting carbon dioxide to bicarbonate.

IMMOBILIZED CARBONIC ANHYDRASE CALCULATIONS

1. Carbonic Anhydrase II has a turnover number of $3.6 \times 10^7$ Moles $CO_2$ $M_{CA}^{-1}$ $m^{-1}$, where $M_{CA}$ *signifies Moles of enzyme.*
2. 1 gram CAII = $3.3 \times 10^{-5} M_{CA}$.
3. Assume 50-percent activity or $1.65 \times 10^{-5}$ moles of active immobilized enzyme.
4. The amount of $CO_2$ hydrated by a reactor containing this amount of enzyme should be:

$$\Delta CO_2 = (1.65 \times 10^{-5} M_{CA})(3.6 \times 10^7 M\ CO_2\ M_{CA}^{-1}\ min^{-1})$$

$$= 5.94 \times$$

$10^2$ Moles $CO_2$ $min^{-1}$ $g_{CA}^{-1}$ 500 Moles $CO_2$ $min^{-1}$ $g_{CA}$ In the case of humans: For humans at rest, $CO_2$ production is about 0.26 1 $min^1$, which amounts to 0.05 Moles $min^{-1}$.

An enzyme reactor containing 1 gram of CAII would be able to process all of the $CO_2$ produced by an individual either at rest or exercising. In the case of internal combustion engines:

Carbon dioxide production by internal combustion engines is about 200 g $Kw^{-1} hr^{-1}$ or 3.7 g $Kg^{-1} min^{-1}$, which amounts to 0.08 Moles $CO_2$ $Kw^{-1}$ $min^1$ Again, 1 g CAII is more than enough enzyme to convert a 1-Kw engine's $CO_2$ into bicarbonate.

As discussed above, the method of enzyme immobilization is not critical so long as at least 0.01% of initial enzyme activity is retained. However, since polyurethane foam is a preferred substrate material, methods for production of polyurethane foams containing carbonic anhydrase immobilized and entrapped therein are described in detail, as follows. The polyurethane sponge is prepared by making an aqueous solution or suspension of the biological material to be entrapped, mixing it with a non-ionic detergent of low toxicity, and then mixing the aqueous phase with a prepolymer of urethane which has the characteristic of being water soluble. Alternatively, the protein can be lyophilized and dispersed in the dry phase prior to mixing with aqueous phase. very high final protein concentrations can be achieved in this way. A number of parameters can be varied by the fabricator in preparation of specific products. Insofar as the physical nature of the polyurethane foam is concerned, the variable parameters and their effect have been described in large part by W. D. Grace and Co., the manufacturer of the hydrophilic prepolymer HYPOL, in a technical brochure entitled "HYPOL Foam Polymer- What it is and what it does". The HYPOL prepolymer contrasts with conventional (hydrophobic) foam preparations, where 3 to 5 parts of water are used per 100 parts of polymer. The amount of water used with HYPOL hydrophilic foam polymer does not have to be carefully adjusted to the approximate stoichiometric equivalent of isocyanate content. Instead, a broad range of water to prepolymer ratios may be used-from 2,000 to 20,000 precent of the theoretical amount required. Preferably, 35 to 200 parts of water per 100 parts of prepolymer are used, depending on the foam characteristics desired. Both cell structure and aesthetic properties of foams produced from HYPOL prepolymer can be controlled by changing the amount of water, type of surfactant, etc. For example:

1. Foams ranging from cosmetic softness to rigid and from conventional open cell structure to fully reticulated.
2. Rapidly wetting to slow, controlled wetting foams can be formed. Such foams absorb and retain from 10 to 30 times their weight of water.
3. Foams with densities of from 2 lbs/ft.$^3$ to 20 lbs./ft.$^3$ can be readily prepared from HYPOL prepolymer. Tensile properties are generally comparable to those of conventional polyurethane.

In addition to these features, the HYPOL Foams have been shown to have fire retardant properties vastly superior to those of conventional foams. Furthermore, favorable results from toxicity tests on HYPOL have been reported.

Insofar as sponge requires the addition of biologically active materials to the aqueous phase prior to polymerization, a few additional variables are introduced relative to the process to be followed. These include (a) the nature of the biological material (or materials), (b) the concentration of the biological material in the aqueous phase, (c) the presence or absence of dispersing agents or detergents with the biological materials, which affects the dispersal of the biological material in addition to its effect on the uniformity of the cell structure and cell size of the polyurethane foam, and (d) the ratio of aqueous phase to dry phase whereby the retention of the biological material in the foam can be regulated. Variables which can be set by the fabricator include the following:

Nature of biological material and concentration per gram of monomer;
Temperature of reaction;
Pressure during the reaction;
Presence or absence of specific detergents or dispersal of the biological material in the water-soluble monomer;
Presence or absence of stirring during the process of catalysis;
Degress of agitation during catalysis;
pH of catalysis (this is subject to a limited amount of control);
Presence of single or multiple substances in the monomer prior to catalysis;
Absolute volume of reaction mixture; and
Ratio of catalyst to monomer solution.

In the order to clarify the exact nature of the CA-containing sponge, a formulation illustrative of typical formulations is as follows:

Aqueous phase (a) 8 ml of enzyme (50 mg protein/ml of $H_2O$ ).

The concentration of enzyme is not critical and can vary from 1 mg/ml to 150 mg/ml or even higher. The enzyme can be from cattle or other animals.

(b) 5 ml distilled water.

(c) 1 ml F-68 (19% by weight in aqueous solution: F-68 is a non-ionic detergent of proven low toxicity; produced by BASF Wyandotte Corporation of Wyandotte, Mich. The presence of detergent is to achieve good reticulation. If non-reticulated foams or if gels are to be made, no detergent is needed. Non-ionic detergents, like Tween or Triton, can be substituted for the F-68. The concentration of detergent is not critical.)

Dry phase (a) 6 g FHP-2000 Hypol Hydrophilic Prepolymer. Hypol is a foamable hydrophilic polyisocyanate manufactured by W. R. Grace and Co., of Cambridge, Mass. Similar formulations are obtained with FHP-2001, FHP 3000 and FHP 3001 prepolymers. Non-foaming Hypol pre-polymers can also be used.

The aqueous and dry phase materials are manually stirred with a glass stirring rod for about 15 seconds. Mixing is carried out under a vacuum hood. The polymerization, carried out at room temperature, is completed in about 3 minutes, and the temperature during the foaming does not exceed 35° C. After the polymerization is complete, the product is rinsed with distilled water to remove excess detergent and unreacted material.

Figure 5:
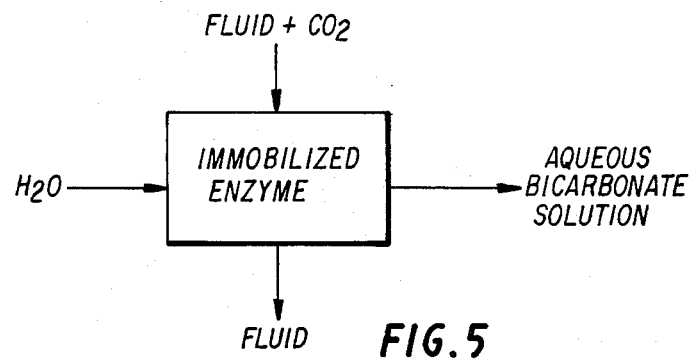
FIG. 5 is a schematic diagram of a generalized process for removing carbon dioxide formed as a by-product in the consumption of the oxygen produced by the process of the invention.

The basic process of this part of the invention is set forth in FIG. 5. Two fluid streams, one comprising water which will react with the carbon dioxide and the other comprising the fluid from which carbon dioxide and the other comprising the fluid from which carbon dioxide will be extracted are brought into contact with immobilized carbonic anhydrase. Two fluid streams are then obtained from the immobilized enzyme, one comprising the fluid from which carbon dioxide has been removed and the other comprising an aqueous stream bicarbonate. Certain embodiments of the invention are set forth in FIGS. 6–8 which will now be discussed in detail. The same reference numbers refer to corresponding parts of each apparatus in the separate drawings.

Figure 6:
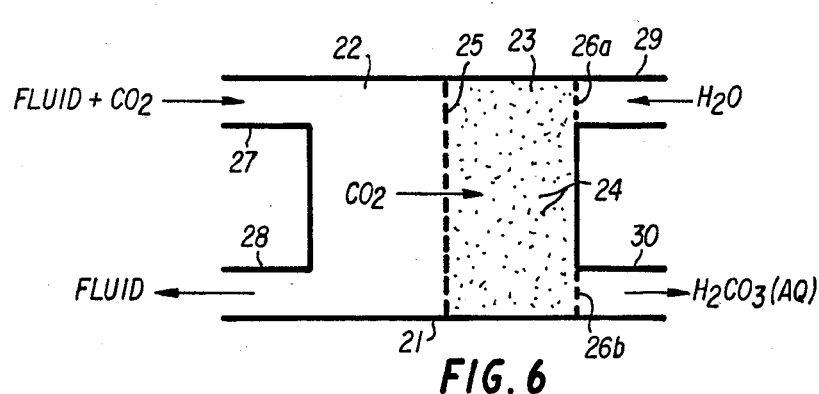
FIG. 6 is a schematic diagram of an apparatus for removing carbon dioxide which utilizes enzyme immobilized in one compartment of a two-compartment chamber divided by a membrane.

FIG. 6 shows an embodiment of this aspect of the invention in which container 21 is divided into two compartments: compartment 22 through which the fluid containing carbon dioxide to be removed is transported and compartment 23 containing immobilized enzyme 24. Compartment 22 is separated from compartment 23 by a gas permeable membrane 25. If immobilized enzyme 24 is attached to the walls of compartment 23 or if immobilized enzyme 24 is present on a solid substrate which is not capable of flowing out of compartment 24, no further entrappment of the enzyme or its support material is needed. However, in the event that the support material is small (for example, gel particles capable of flowing with water) means for entrapping the flowable substrate, shown in FIG. 6 as screens 26a and 26b, are required. Compartment 22 is fitted with a fluid inlet 27 and a fluid outlet 28 by which fluid containing carbon dioxide to be removed and fluid from which carbon dioxide has been removed are respectively introduced to and removed from chamber 22. Inlet 29 and outlet 30 are likewise provided for chamber 23 to provide entrance of water and exit of aqueous carbonic acid solutions, respectively. The invention is carried out by flowing fluid containing carbon dioxide through inlet 27 into chamber 22 where the carbon dioxide passes across gas permeable membranes into compartment 23. The fluid then exits compartment 22 through outlet 28. Carbon dioxide reacts in chamber 22 with immobilized enzyme 24, in the presence of water which is directed into chamber 23 through inlet 29. The aqueous carbonic acid solution formed by conversion of carbon dioxide by immobilized enzyme 24 into carbonic acid exits chamber 23 through outlet 30. Of course, although FIG. 6 shows concurrent flow of fluids past the membrane, it is also possible to carry out the invention using countercurrent flow or a combination of concurrent and counter-current flow so long as contact is maintained between water and the fluid across gas permeable membrane 25.

Figure 7:
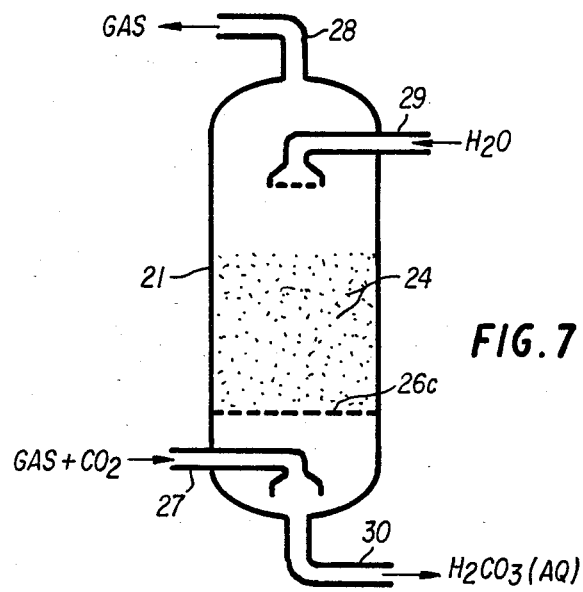
FIG. 7 shows an embodiment for removing carbon dioxide by the countercurrent flow of water and a gas stream containing carbon dioxide.

FIG. 7 shows an embodiment of the invention wherein carbon dioxide is being removed from a gas stream and there is no pressure differential between this gas stream and the pressure on the water stream which reacts with the carbon dioxide. Container 21 is a vertical enzyme reactor container in which carbonic anhydrase is immobilized on a porous substrate (24). Substrate 24 is held in place by a substrate support 26c, which may be a fine screen when the support by which the enzyme is immobilized is a porous gel. In this embodiment, the container is not divided into separate chambers and no gas permeable membrane need be present. The gas stream from which carbon dioxide is to be extracted is injected into container 21 through inlet 27. The gas and carbon dioxide diffuse upwardly through the reaction zone where carbon dioxide is converted by immobilized enzyme 24 into carbonic acid. The gas stream, free of carbon dioxide, continues upwardly where it is removed from container 21 through gas outlet 28. Water is injected into the reaction zone through inlet 29 and passes downwardly through the reaction zone under the influence of gravity, reacting with carbon dioxide under the influence of immobilized enzyme 24. The thus-formed carbonic acid solution passes through the reaction zone and is collected and transported away through outlet 30. Many variations of an apparatus of the type shown in FIG. 7 are well known to those skilled in the art and can be adapted to the present invention by the immobilization of carbonic anhydrase instead of other enzymes.

Figure 8:
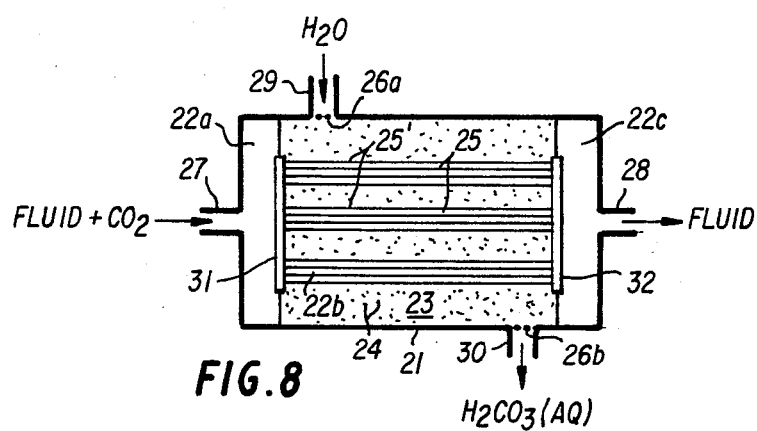
FIG. 8 is a schematic diagram of a device for removing carbon dioxide from a gas stream based on a hollow fiber cartridge.

FIG. 8 shows a particularly preferred embodiment of the invention which is useful when there is a significant pressure difference between the water supplied to the reactor and the fluid from which carbon dioxide is being removed. The apparatus is designed in the form of a hollow fiber cartridge as container 21. The hollow fiber bundles 25', each including a plurality of hollow fiber membranes 25, are held in place at opposite ends thereof by manifolds 31 and 32. Since the fluid containing carbon dioxide flows into the hollow fiber cartridge (container 21) through inlet 27, both the manifold space 22a near the inlet, the interior space 22b of the hollow fiber membranes 25, and the manifold space 22c in the vicinity of exit manifold 32 represent the space which corresponds to compartment 22 of FIG. 6. Hollow fiber membranes 25 divide this space from compartment 23 which surrounds the hollow fiber bundles 25'. Fluid and carbon dioxide enter through inlet 27 and exit through outlet 28 from compartment 22. Water enters compartment 23 through inlet 29 and exits through outlet 30. Immobilized enzyme 24 is present in compartment 23. Screens 26a and 26b are present (if necessary) to retain immobilized enzyme 24 in compartment 23.

Figure 9:
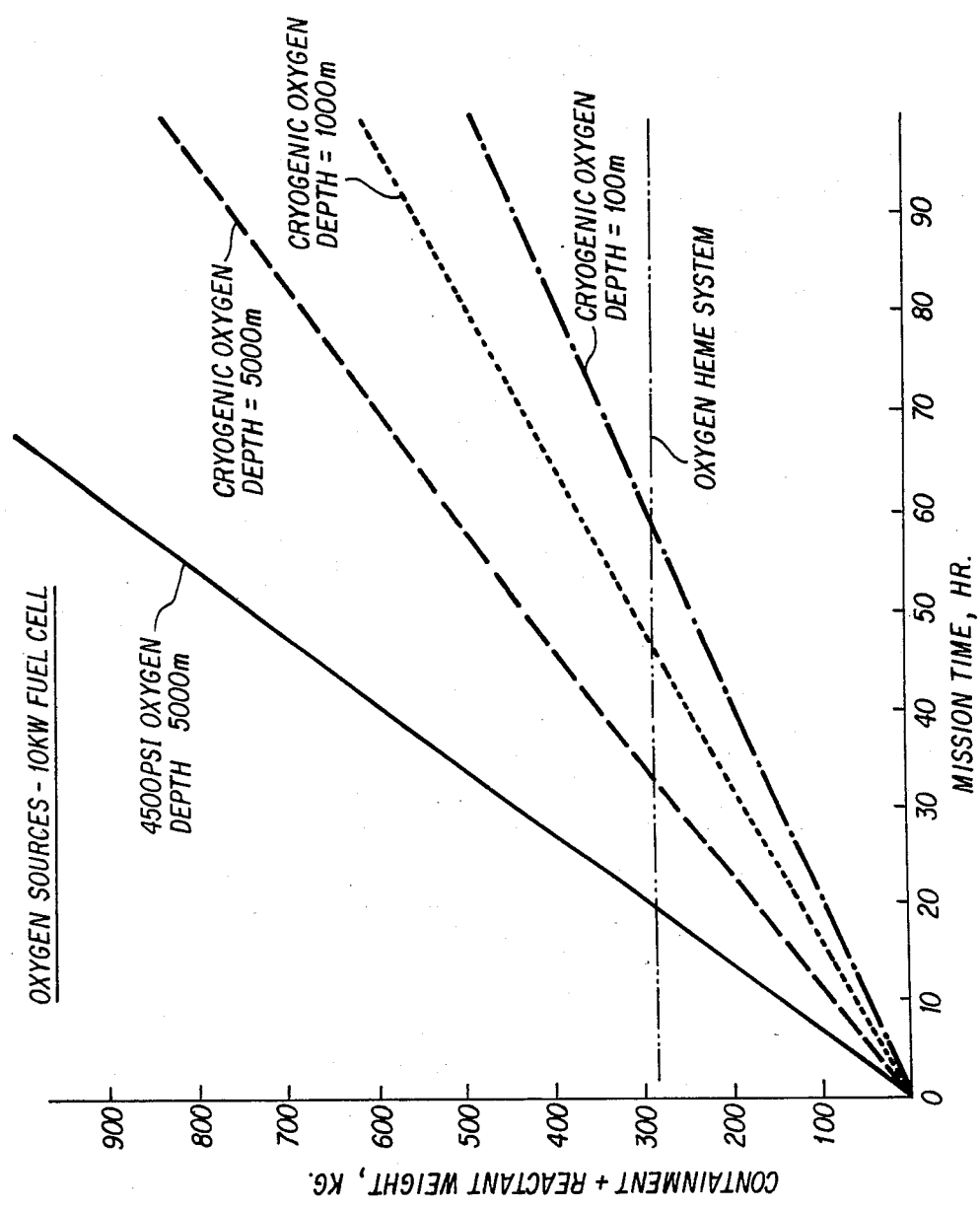
FIG. 9 is a plot showing weight advantages for the system of the invention over other systems of providing stored oxygen in underwater applications.

Independent engineering evaluations have been carried out at the direction of the inventors. The two studies indicated that both underwater and above water applications are feasible. FIG. 9, obtained from one of the studies, shows a comparison of the oxygen extractor (based on the characteristics of heme in 1-methylimidazole) and conventional storage methods. Cryogenic storage systems and high pressure storage systems are compared to the heme system on a weight basis versus mission time at various depths. The heme system results in system-weight savings over each of the conventional storage methods at varying payoff points. The payoff for the heme system over high pressure oxygen storage is at low mission times (20 hours at 2,000 meter depth and less). The heavy pressure vessels involved in high-pressure oxygen storage increase in weight linearly with respect to mission time and heavily penalize this oxygen storage mode versus the heme system. An additional comparison exists between the heme system and cryogenic oxygen storage. The heme system payoff occurs at 60 hours at 100 meters, 47 hours at 1,000 meters, and 33 hours at 5,000 meters. Therefore, the system of the invention has a clear advantage over cryogenic vessels for supplying oxygen in deep underwater dives of moderate duration.

An advantage inherent in the system of the invention is that there are no tank refilling requirements as exist for all other oxygen supply systems for underwater use. This is important expecially in the handling of cryogenic oxygen where a significant threat of accidents and even explosions exists. The absence of a refilling operation further adds flexibility to the system of the invention by allowing operation in remote locations where oxygen supply capabilities, expecially cryogenic supply, must normally be provided by a support craft.

Figure 10:
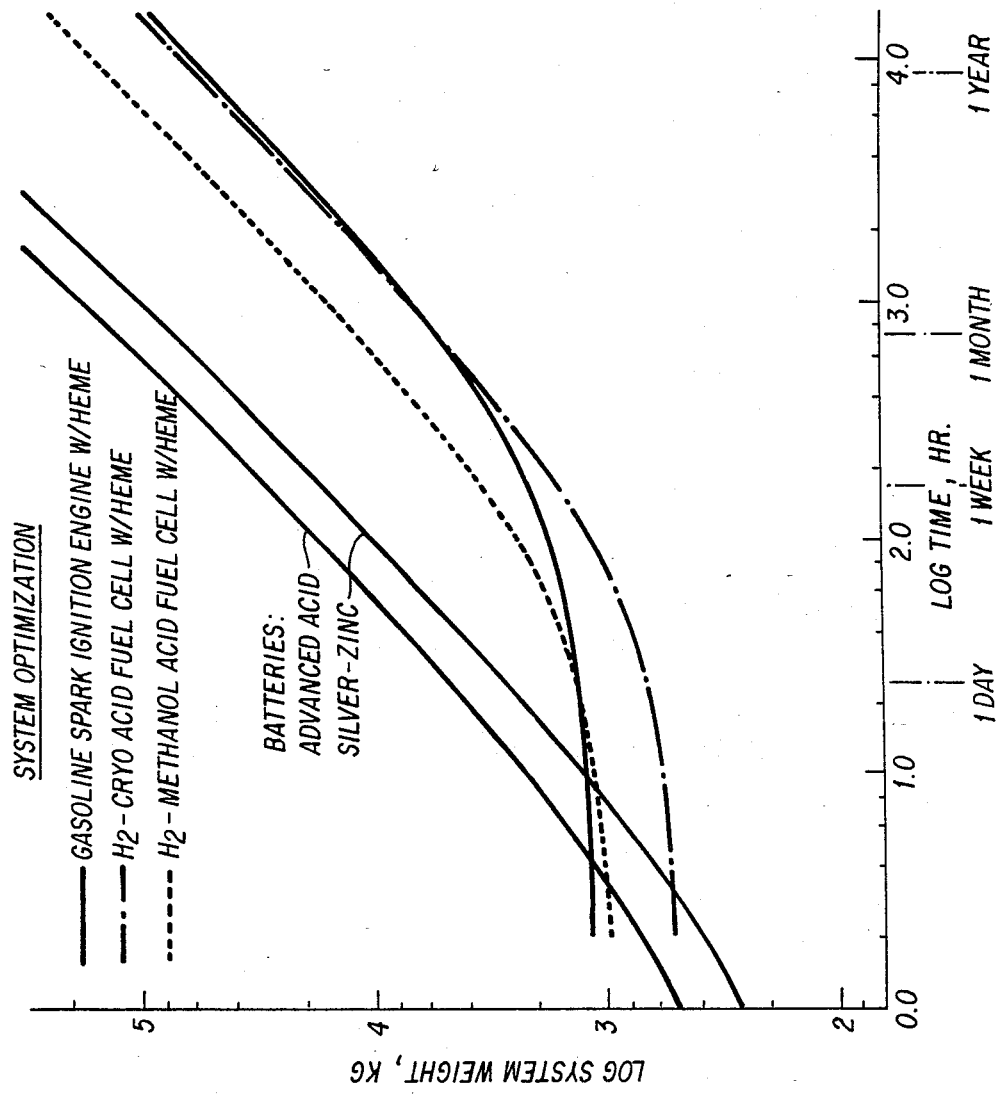
FIG. 10 is a plot showing weight advantages of underwater propulsion systems using oxygen extracted according to the process of the invention over battery-powered underwater propulsion systems.

Additional advantages are evident in FIG. 10 from the same studies. A comparison of system weight for underwater vehicles powered by either batteries or by an engine or fuel cell utilizing oxygen extracted according to the method of the present invention is shown in FIG. 10. It can be seen that weight payoffs occur in less than 1 hour for either a gasoline-spark ignition engine, a cryogenic hydrogen-acid fuel cell, or a hydrogen-methanol acid fuel cell utilizing oxygen extracted from water. It can be seen from the ratios of system weights that a propulsion system powered using oxygen extracted according to the method of the invention can have a weight penalty less than one-thirteenth of the weight penalty of battery powered propulsion units.

Comprehensive engineering calculations were carried out to determine whether or not the method of the invention could operate an underwater energy producing system without requiring more energy than that which could be produced from the oxygen extracted. The results of the engineering calculations for two types of units, a diver propulsion unit powered by a spark ignition engine and a commercial robot vehicle powered by an acid fuel cell, are shown in Tables 1 and 2 which follow.

TABLE 1

| DIVER PROPULSION UNIT | |
|---|---|
| CONVERTER: Spark Ignition Engine | |
| FUEL: Gasoline | |
| GENERAL: HEME POWER SYSTEM | |
| Net Power | 0.75 KW |
| Gross Power | 0.954 KW |
| Total Energy | 1.5 KW |
| Depth Range | 0–100 m |
| Weight | 63.6 kg |
| Overall Efficiency | 23.55% |
| Oxygen Required | 12.18 l/min |
| PROPULSION | |
| Peak Power | 0.75 KW |
| Duration at Peak Power | 2 hours |
| BATTERIES | 0.0 |
| KWH Storage | |
| HEME SYSTEM POWER REQUIREMENTS | |
| Heme Unloading | 0.128 KW |
| Heme Pumping | 0.077 KW |
| $CO_2$ Disposal | 0.0 KW |
| Total Power Required | 0.205 KW |
| SYSTEM WEIGHT (Power Only) | |
| Heme Oxygen Extractor | 57.0 Kg |
| Motor and Controls | 0.0 Kg |
| Power Converter | 6.0 Kg |
| Batteries | 0 Kg |
| Fuel System | 0.61 Kg |
| Total | 63.6 Kg |
| OXYGEN EXTRACTION SYSTEM | |
| Seawater Flow (50% eff) | 4872 l/min |
| Gill Frontal Area | 0.162 m² |
| Seawater Velocity | 1 kt |
| Heme Fluid Flow Rate | 20.3 l/min |
| ENERGY DENSITY | 23.6 WH/Kg |

TABLE 2
COMMERCIAL ROBOT VEHICLE
CONVERTER: Acid Fuel Cell
FUEL: Hydrogen from Reformed Methanol

| GENERAL: HEME POWER SYSTEM | |
|---|---|
| Net Power | 10 KW |
| Gross Power | 14.5 KW |
| Total Energy | 400 KWH |
| Depth Range | unlimited |
| Weight | 1101 Kg |
| Overall Efficiency | 37.94% |
| Oxygen Required | 87.84 l/min |
| PROPULSION | |
| Peak Power | 10 KW |
| Duration at Peak Power | 40 hours |
| BATTERIES | 0.0 |
| KWH Storage | |
| HEME SYSTEM POWER REQUIREMENTS | |
| Heme Unloading | 0.920 KW |
| Heme Pumping | 0.560 KW |
| $CO_2$ Disposal | 3.02 KW |
| Total Power Required | 4.50 KW |
| SYSTEM WEIGHT (Power Only) | |
| Heme Oxygen Extractor | 412 Kg |
| Motor and Controls | 25 Kg |
| Power Converter | 257 Kg |
| Batteries | 0 Kg |
| Fuel System | 407 Kg |
| Total | 1101 Kg |
| OXYGEN EXTRACTION SYSTEM | |
| Seawater Flow (50% eff) | 35140 l/min |
| Gill Frontal Area | 1.17 $m^2$ |
| Seawater Velocity | 1 knot |
| Heme Fluid Flow Rate | 146. l/min |
| ENERGY DENSITY | 363 WH/Kg |

Table 1 shows the significant characteristics of the diver propulsion unit. Its gross power is approximately 1 KW with 25% of its power going back into the oxygen extraction system. The 0.75 KW net power output corresponds to 1 horsepower. The diver propulsion unit could just as well utilize a 1 KW methanol-fueled acid fuel cell.

Table 2 shows the significant operating characteristics of a potential commercial robot vehicle with a net power capability of 10 KW and a total storage capability sufficient to operate the vehicle for 400 KW hours. This vehicle could therefore work at full power for a duration of 40 hours or for longer periods at reduced power output. The energy converter proposed in the calculations is a phosphoric acid fuel cell fueled by reformed methanol. The gross power of the system is 14.5 KW with approximately 30% of the power being used to operate the combination of the oxygen extractor of the invention and a carbon dioxide disposal system. The net power is therefore 10 KW. Such robot vehicles now exist and are typically powered using silver-zinc battery systems. The advantages of the present invention are readily apparent in this situation since a comparable silver-zinc battery system would weight more than 3.6 times as much as an oxygen extraction system of the invention.

Figure 11:
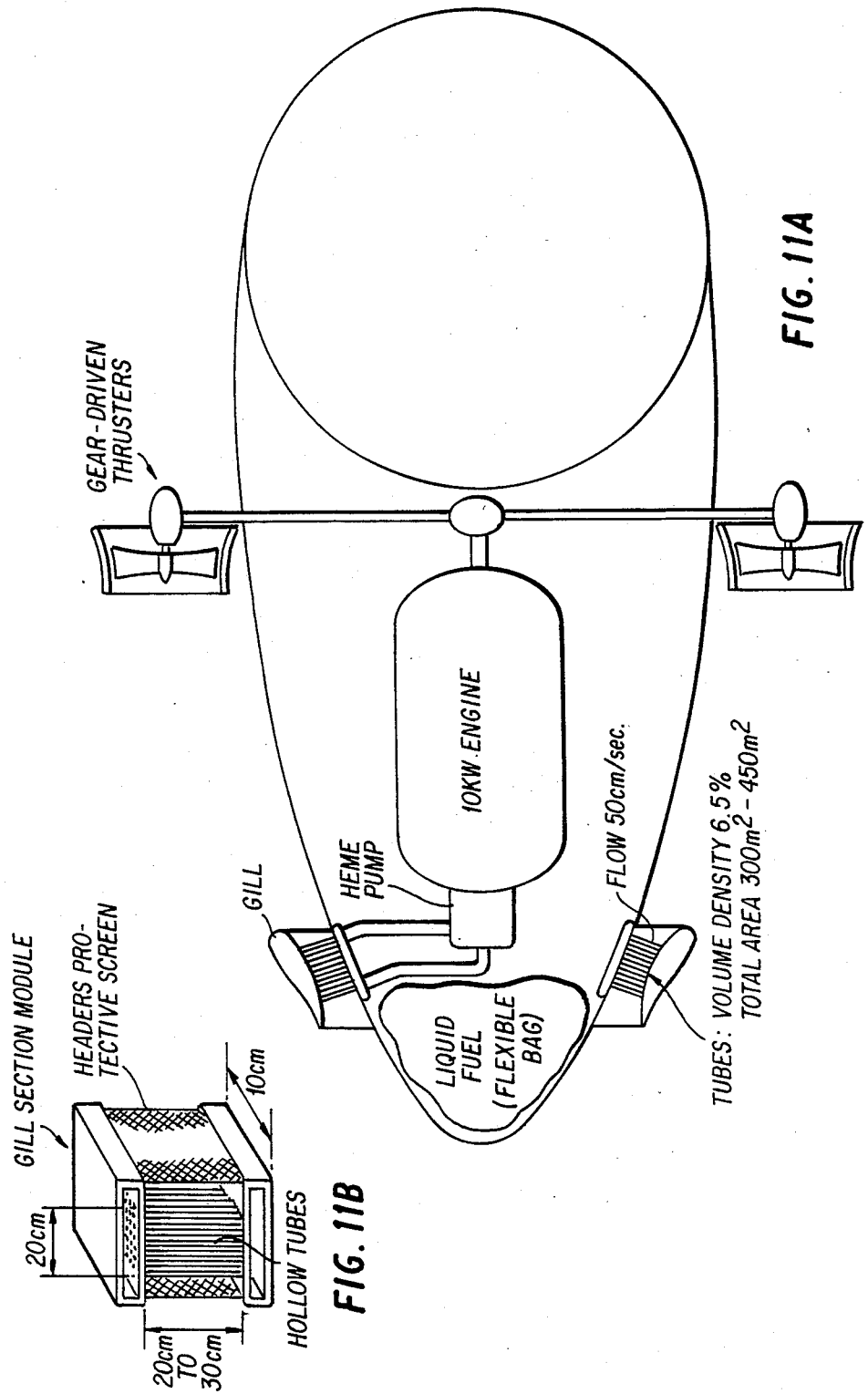
FIG. 11 shows an underwater vehicle which extracts oxygen by the process of the invention.

Accordingly, the present invention can readily be adopted to the propulsion of underwater vehicles which are now known. FIG. 11 shows a conceptual submersible propulsion system using an oxygen extractor of the invention, shown in FIG. 11 in a preferred embodiment using hollow fibers to extract oxygen from seawater and heme as an oxygen carrier.

Figure 12:
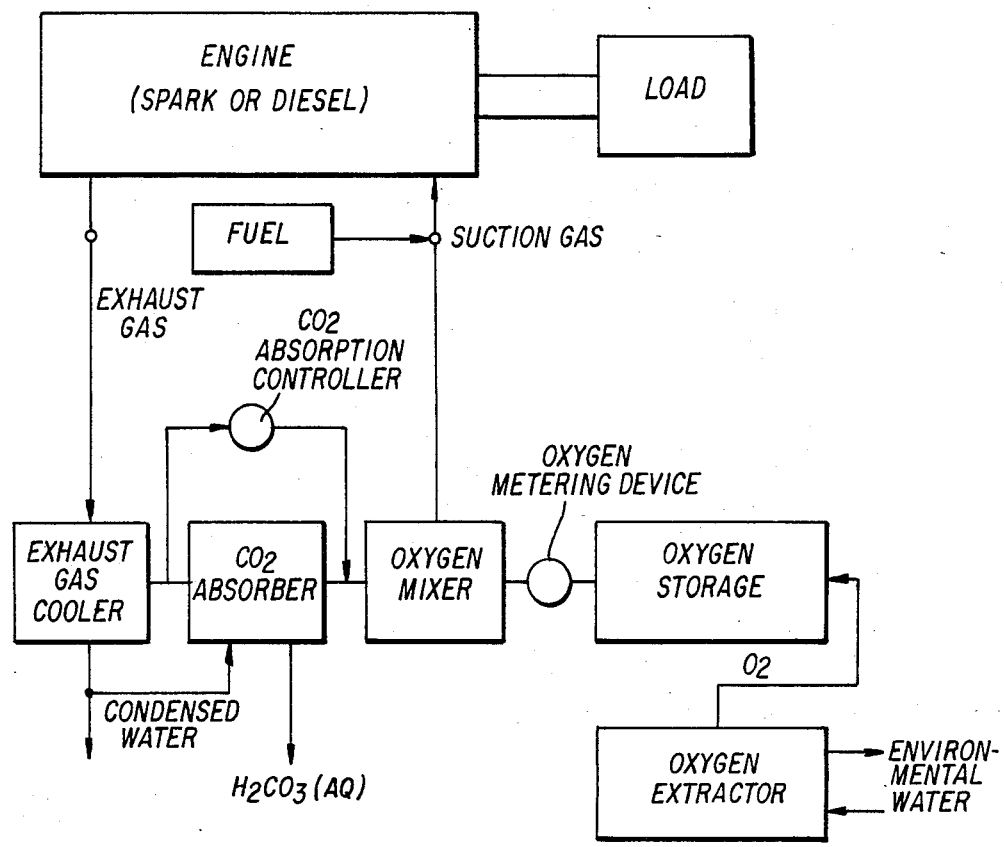
FIG. 12 shows a block diagram of a spark or diesel engine operating in closed exhaust mode in combination with an oxygen extractor of the invention.
Figure 13:
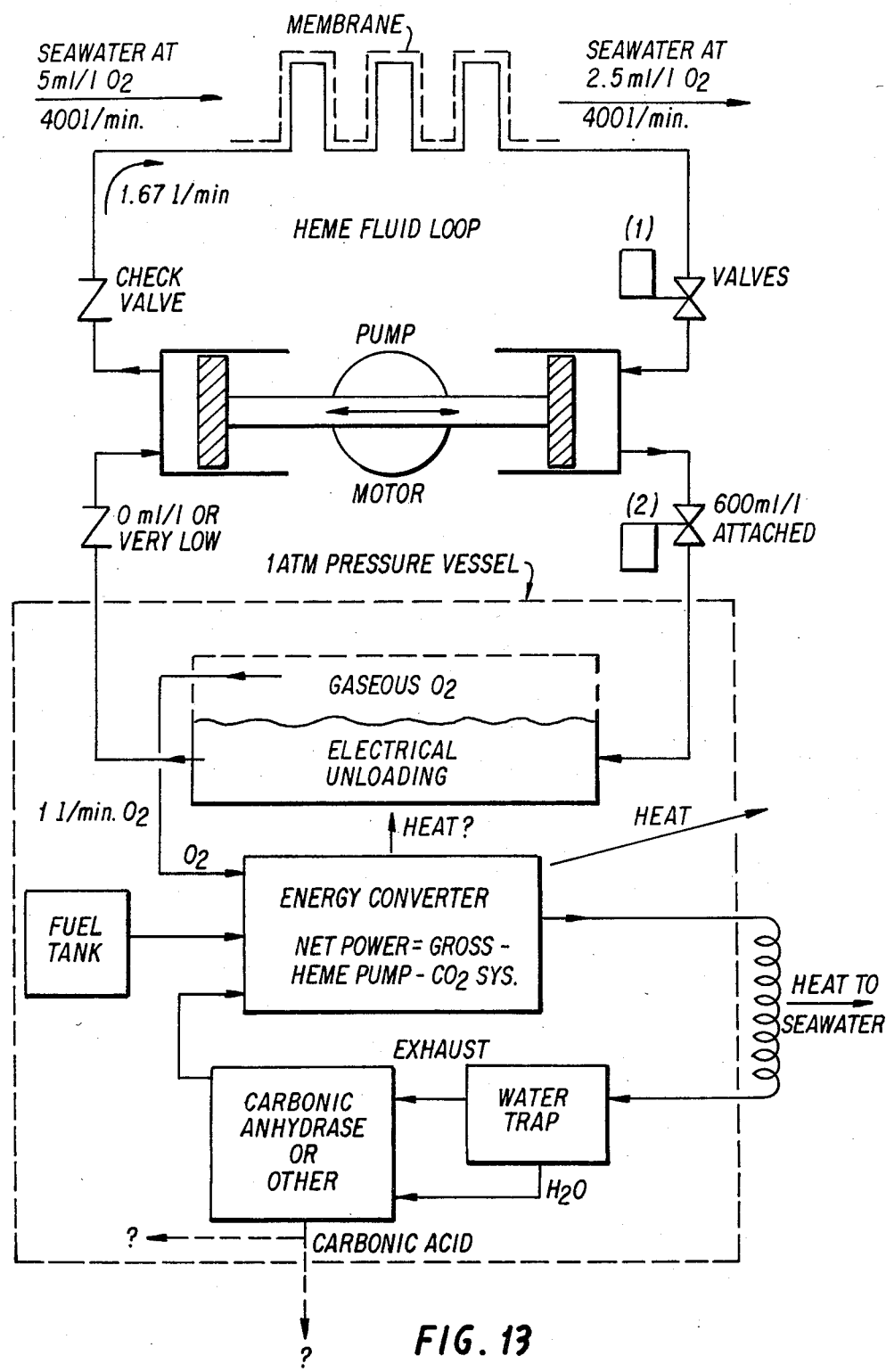
FIG. 13 shows in block diagram form an oxygen extraction system of the invention.

FIGS. 12 and 13 show in block diagrams how an oxygen-consuming, hydrocarbon-consuming engine can be operated underwater in combination with the present invention. In FIG. 12, and oxygen extractor extracts oxygen from environmental water and furnishes oxygen to an oxygen storage vessel. An oxygen metering device determines when oxygen is needed by the engine, at which time oxygen is allowed to enter a chamber (oxygen mixer) where the oxygen is mixed with recycled engine combustion gasses. Oxygen for combustion is supplied from the oxygen mixture to the inlet of the engine along with fuel. Exhaust gas from the engine outlet passes to an exhaust gas cooler where condensed water is removed. The condensed water may either be discarded or utilized in the next stage of the apparatus, a carbon dioxide absorber. In the carbon dioxide absorber, carbon dioxide is converted (in the embodiment shown) to carbonic acid which is then discarded. Absorption of carbon dioxide is controlled by a carbon dioxide absorption controller which allows unabsorbed carbon dioxide to bypass the carbon dioxide absorber when necessary for maintaining the proper gas volume to use in the engine. Gasses leaving the carbon dioxide absorption controller and the carbon dioxide absorber pass to the oxygen mixer and the cycle is repeated.

FIG. 13 shows the operation of FIG. 12 with emphasis on the oxygen extractor itself. In the embodiment shown, seawater passes over a gill comprising a membrane in contact with the fluid loop comprising the carrier fluid and the oxygen carrier (the heme-fluid loop in the embodiment shown). The carrier fluid is transported through its cycle by means of a pump. When the carrier fluid and oxygen carrier reach the electrochemical cell, electrical unloading and production of gaseous oxygen occur. The oxygen carrier is then reconverted to the oxygen binding form as has been previously described, and passes back into circulation through the fluid loop. In the embodiment shown, unloading occurs inside a 1 atmosphere pressure vessel, and the gaseous oxygen produced is transported to an energy converter (an engine) which converts this oxygen and fuel stored in a fuel tank to energy. Heat produced in this process is either exhausted from the vessel or can be used to assist oxygen unloading if desired. Exhaust gasses from the engine pass through cooling coils which exhaust heat to the surrounding seawater. A water trap removes combustion water which in the embodiment shown is transported to a carbonic anhydrase or other carbon dioxide absorber. The remaining exhaust gasses, including the carbon dioxide produced by combustion, also pass into the carbonic anhydrase reactor. Carbonic acid produced as a waste product is either stored inside the pressured vessel or dumped into the surrounding seawater. Unabsorbed gasses are transported back to the energy converter for another cycle.

Figure 14:
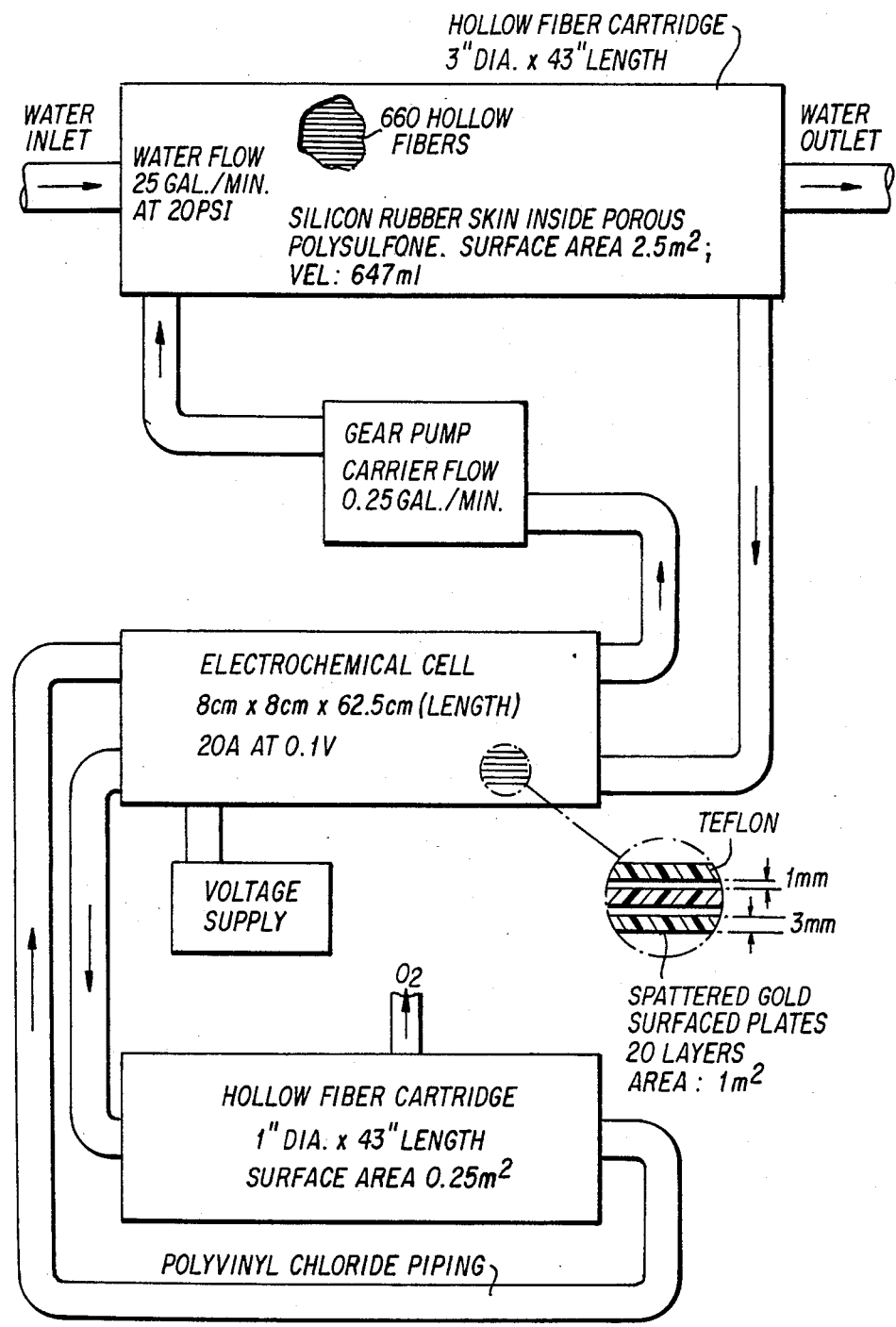
FIG. 14 shows in block diagram form specific parameters of a preferred embodiment of an oxygen extraction apparatus.

FIG. 14 shows a block diagram of a preferred oxygen extractor with emphasis on the details of the different stages (oxygen loading station, electrochemical cell, and oxygen unloading station). The oxygen loading station is a hollow fiber cartridge 3 inches in diameter and 43 inches in length containing 660 hollow fibers made of porous polysulfone with a silicon rubber skin on the inner surface. The surface area of the hollow fibers is 2.5 $m^2$ and the internal volume is 647 ml. The internal volume of the entire closed system is approximately 1 liter. In the embodiment shown, the oxygen carrier is heme and the carrier is 1-methylimidazole (concentration of heme: 20 mM). A gear pump causes carrier to flow through the closed system at 0.25 gallons per minute while water flows through the interior of the hollow fibers (25 gallons per minute, 20 psi). Circulating heme passes from the oxygen loading station to the anode of an electrochemical cell formed from teflon plates 3 mm thick and spaced 1 mm apart. The plates are 8 cm wide and 62.5 cm long, and 20 plates are stacked into an area 8 cm high, thereby providing a surface area of approximately 1 $m^2$. Sputtered gold forms the electrode on the surface of the plates. The electrochemical cell is connected to a voltage supply (20 amps at 0.1 volt). After leaving the anode chamber, oxidized heme and oxygen pass into a second hollow fiber cartridge, this time passing through the interior of the hollow fibers. This unloading station is identical with the hollow fiber cartridge loading station except that the cartridge is only 1 inch in diameter with a resulting surface area for the hollow fibers of 0.25 $m^2$ and a similarly reduced interior volume. Oxygen passes through the hollow fiber membranes and is available for use. The oxidized heme in the carrier fluid passes back into the electrochemical cell, this time entering the cathode compartment where the oxidized heme is reduced to an oxygen binding form. This heme now circulates back to the oxygen loading station (first hollow fiber cartridge) and the cycle is repeated. Polyvinyl chloride piping is used to transport the carrier fluid and heme between the various stations.

In addition to the undersea operations, engineering evaluations of above-water systems also indicate the feasibility of the present invention. The process and apparatus of the invention are cost competitive with cryogenic and pressure-swing adsorption systems, both of which typically yield a lower purity product (frequently contaminated with argon and lesser traces of hydrocarbons and carbon dioxide). Furthermore, the cryogenic systems are energy intensive when compared with the oxygen extraction system of the invention. For example, a typical 500 ton/day oxygen plant delivering only 95% oxygen requires about 31 watts/L/min of electrical power (Shreve et al, Chemical Process Industries, 4th ed., McGraw-Hill, 1977, p. 110). By comparison, the heme-based system requires about 5–10 watts/L/min. Even accounting for the energy required to compress the oxygen from the system of the invention, the potential energy savings are significant.

In an embodiment of the invention that is particularly useful for purifying oxygen from air, the electrochemical cell can be eliminated. An apparatus of the invention will then comprise the oxygen loading and unloading stations as described herein without the electrode compartments. Such an apparatus takes advantage of the reversible nature of the oxygen binding reaction itself. Reduction of the partial pressure of oxygen in the region of the membrane of the oxygen unloading station will result in release of oxygen, as is described in detail for immobilized hemoglobin in U.S. Pat. Nos. 4,427,416 and 4,343,715. This can easily be accomplished when oxygen is collected as compressed, bottled gas by connecting the inlet port of a compressor to a chamber formed on the exit ride of the membrane at the oxygen unloading station. Attached in this way, the compressor acts as a vacuum pump by reducing pressure on the second side of the membrane. This embodiment retains the advantages of a sealed oxygen carrier while further reducing the energy required to produce compressed, purified oxygen (i.e., the unloading and compression steps utilize a single power source).

In other embodiments of an apparatus useful for extracting oxygen from air, it is possible to replace the membrane with a gas/liquid interface between air and a liquid carrier. Thus, the term "membrane" as used herein also encompasses such interfaces. For example, air can be bubbled into a liquid carrier fluid containing an oxygen carrier, which will selectively bind oxygen and allow the remaining gasses (mostly nitrogen) to escape. The carrier fluid and bound-oxygen complex is then transported to a second location where purified oxygen is released in any of the manners previously discussed. Under these conditions the previously described inventive step of contacting a "membrane" with an environmental fluid would comprise forming a bubble, whose interface would thereafter act as a membrane, in a liquid carrier fluid. The remaining steps would be carried out as described elsewhere in this specification.

Figure 15:
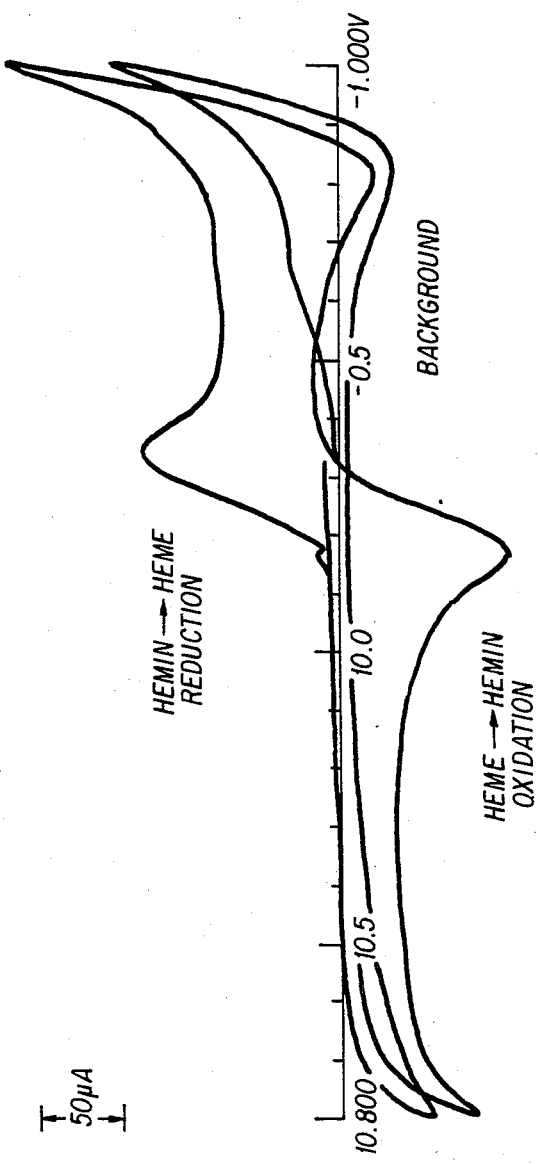
FIG. 15 shows in graphical form cyclic voltammetry of an oxygen carrier of the invention.

In addition to these engineering studies, laboratory experiments have also demonstrated the feasibility of the present invention. In particular, the chemical and thermodynamic reversibilities of the electric cycling process has been demonstrated with cyclic voltammetry. For example, FIG. 15 shows cyclic voltammetry of heme and 1-methylimidazole. Experimental conditions were as follows: initial potential, −325 mv; highest potential, 800 mv; lowest potential, −1,000 mv; sweep rate, 200 mv/sec; sweep segments, 3; initial sweep, negative.

Figure 16:
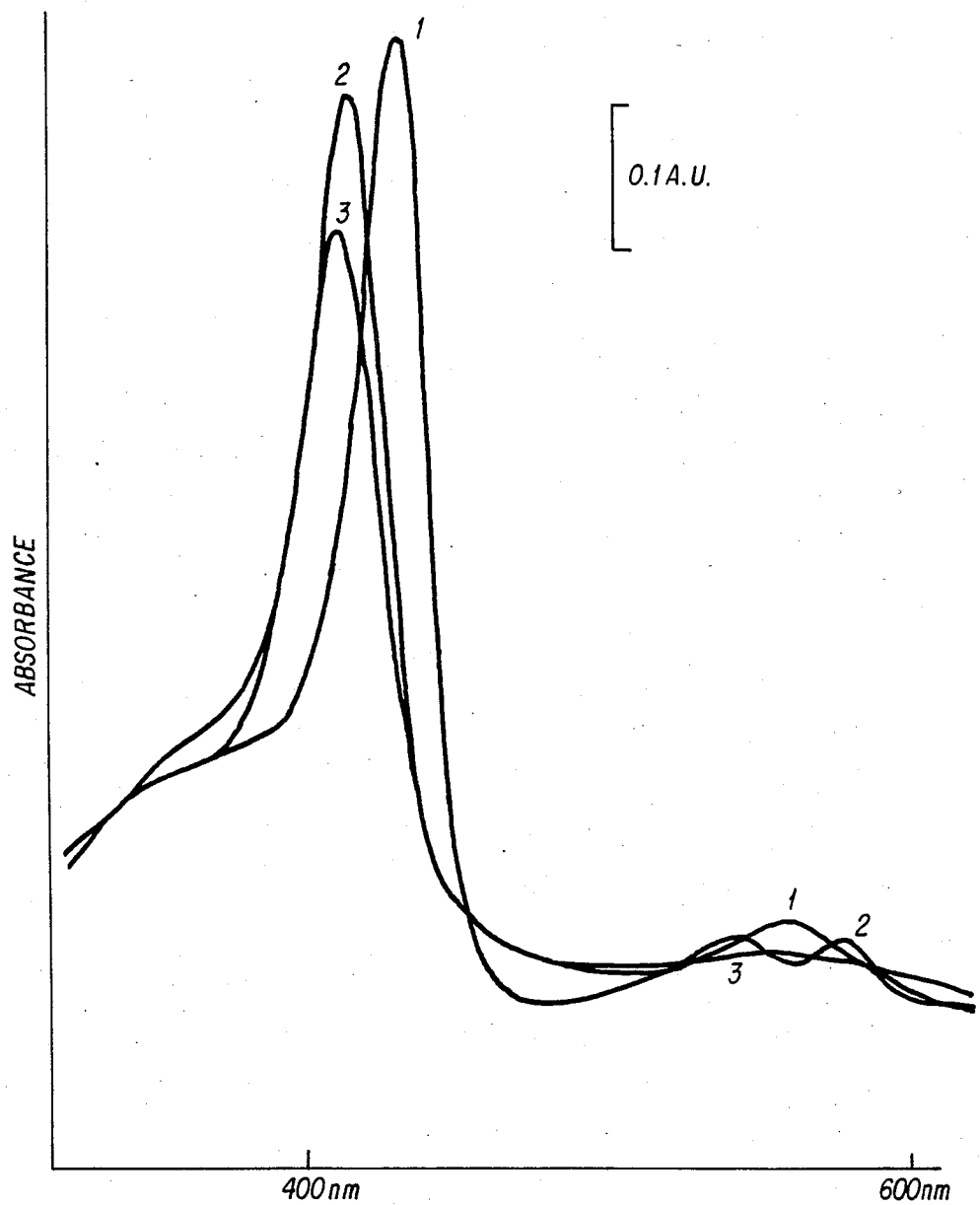
FIG. 16 shows in graphical form spectra of the oxidized and reduced forms of an oxygen carrier of the invention.

FIG. 16 shows experimentally the ability to detect different oxygen binding techniques by spectroscopy. Three spectra are shown in FIG. 16, all showing different forms of hemoglobin A. Spectrum 1 shows the reduced form of hemoglobin. A with oxygen bound to the hemoglobin (form present at a potential of −50 mv) Spectrum 2 shows electrochemically oxidized hemoglobin showing that the oxygen is no longer bound (spectrum obtained at a potential of +600 mV). Spectrum 3 shows electrochemically re-reduced hemoglobin after removal of oxygen from the solution. When oxygen is replaced in the solution, the process can be repeated. The carrier was modulated with a direct electrode electron transfer, not a chemical oxidant/ reductant.

To date, three experiements have been conducted that indicate the electrochemical modulation of dioxygen carriers resulting in the binding and release of dioxygen. These experiments were conducted on two classes of systems: natural macromolecule carriers in aqueous media and synthetic "heme-type" carriers in non-aqueous media. These experiments have been summarized in the table that follows.

TABLE 3

| CARRIER | SOLVENT | ELECTROLYTE | ELECTRODE | DETECTION |
|---|---|---|---|---|
| Hemoglobin | water | Phosphate | Au,C,Pt | Spectral |
| Co(PFP) | DMSO/Me-Im | TEACl | Au(C) | visual |
| Fe(CapP) | DMSO/Me-Im | TEACl | Au(C) | visual |

Experiments with Hemoglobin

These experiments are as described immediately above. Recent experiments included the presence of a mediator in the same solution (0.1 mM methylene blue) that facilitated the electron transfer to hemoglobin. This resulted in the reduction of the amount of energy necessary to cyclicly oxidize and reduce human hemoglobin from 30 Kcal/mole to 4 Kcal/mole. This simply makes the energetics of the process much more favorable.

Experiments with Synthetic "Heme-Type" Carriers

Two experiments have been carried out on these systems: one with a "picket fence" porphyrin containing Cobalt as the central metal ion (where the dioxygen binds) and one with a "capped" porphyrin containing Iron as the central metal ion. These two molecules are shown in FIG. 17. The experimental procedure was identical in both cases, as was the solvent, electrode material, supporting electrolyte, and cell geometry. The concentration of carriers was high enough to produce an amount of released oxygen that would cause supersaturation of the dioxygen in solution. The solvent/electrolyte system contained: 90% Dimethylsulfoxide, 10% 1-methyl-imidazole and 0.1 Molar tetraethylammonium chloride. The reference electrode used was Ag/AgCl.

Figure 18A:
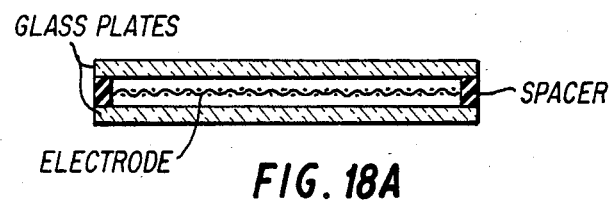
Figure 18B:
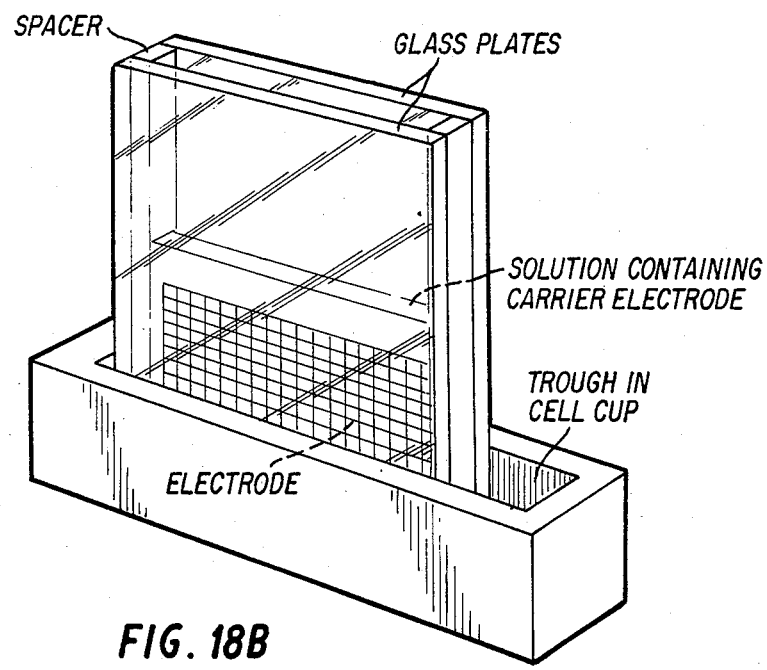

The cell is diagrammed in FIG. 18. The working electrode (which behaves alternatively as either anode or cathode) is a gold transparent mesh sandwiched between two pieces of glass. This apparatus is placed in a "cup" that holds the counter electrode and reference electrode as well as some solution to be examined. The solution of interest is drawn up to the working electrode where it can be both controlled by the application of potentials and currents as well as observed through the glass sides. This observation was both spectroscopic and visual. The system was subjected to cyclic voltammetry in order to determine the redox potential of the carrier as well as to determine the presence of other competing chemical reactions.

After determining the redox potential (approx. 0.0 V vs Ag/AgCl for the Co-Picket fence porphyrin and 0.1 V vs Ag/AgCl for the Fe-capped porphyrin in these solutions), the solutions were set to a potential that ensured that the carrier was in the reduced, dioxygen binding form. This was −0.400 V vs Ag/AgCl. The solution was allowed to achieve equilibrium for three hours, and the spectra taken through the working electrode showed this to be the case. The solution containing the carrier was contacted with air, at this point, to allow the binding of dioxygen to the carrier. Several hours of contact with the atmosphere ensured the equilibrium binding. At this point, the carriers were stepwise oxidized by jumping the potential more positive at the working electrode. The time between steps was roughly 30 minutes and small potential steps were taken so the entire duration of the experiment was approximately twelve hours (within 15 minutes). At the end of the oxidative potential steps, the solution showed bubbles of released gas around the electrode. The bubbles were not present in any other portion of the apparatus. A photograph of oxygen bubbles is shown in FIG. 19. The grid shown is the mesh electrode. While the only electrode material that was used in these particular experiments was gold, when these carriers were examined using cyclic voltammetry for their redox activity, both showed adequate rates of electron transfer to be useful in this process. As a result, it appears that carbon is also a suitable electrode material for use.

When the same experiment was conducted on a solution identical to those employed above - but not containing a carrier- no gas was extracted from the air and no bubbles were produced anywhere in the cell.

The patents and other publications cited throughout this application are indicative of the state of the art. All patents and publications mentioned in this specification are herein incorporated by reference.

The invention now being fully described, it will be apparent to one of ordinary skill in the art that many changes and modifications can be made thereto without departing from the spirit or scope of the invention as set forth herein.

What is claimed as new and desired to be secured by Letters Patent of the United States is:

1. A method for extracting oxygen from a fluid environment, which comprises the steps of:
(1) contacting a first fluid environment containing oxygen with a first surface of a first oxygen permeable membrane having a first and a second surface, wherein said membrane separates said environment from an interior space of a closed container,
(2) contacting a carrier fluid with said second surface of said membrane, wherein said carrier fluid is confined in said closed container and said carrier fluid contains a binding-state oxygen carrier, whereby oxygen which diffuses through said membrane binds to said carrier to give a bound oxygen complex,
(3) transporting said carrier fluid containing said bound oxygen complex to a first electrode compartment of an electrochemical cell which forms a second portion of said closed container,
(4) electrochemically modifying said binding-state oxygen carrier to an oxidation state having less binding affinity for oxygen, thereby releasing free oxygen into said carrier and producing a nonbinding-state oxygen carrier,
(5) removing oxygen from said carrier fluid to give an oxygen-depleted carrier fluid,
(6) transporting said oxygen depleted carrier fluid containing said nonbinding-state oxygen carrier to a second electrode compartment of an electrochemical cell which forms a third portion of said closed container, and
(7) electrochemically modifying said nonbinding-state oxygen carrier to reform said binding-state oxygen carrier.

2. The method of claim 1 wherein steps (2)–(7) are repeated while fresh fluid from said environment is contacted with said first surface of said membrane.

3. The method of claim 1 which further comprises the step of:
transporting said carrier fluid containing said nonbinding state oxygen carrier and free oxygen to a fourth portion of said closed container where oxygen is removed from said carrier fluid to give said oxygen-depleted carrier fluid.

4. The method of claim 3 wherein said removing oxygen comprises contacting said carrier fluid with a second oxygen permeable membrane which separates said carrier fluid from a second fluid environment which contains a partial pressure of oxygen less than the partial pressure of oxygen in said carrier fluid.

5. The method of claim 4 wherein the partial pressure of oxygen in said second fluid environment is greater than the partial pressure of oxygen in said first fluid environment.

6. The method of claim 1 wherein said binding-state oxygen carrier has a lower oxidation state than said nonbinding-state oxygen carrier.

7. The method of claim 6 wherein said bindingstate oxygen carrier comprises a $Co^{2+}$ or $Fe^{2+}$ ion chelated in a porphin-ring-containing compound and said nonbinding-state oxygen carrier comprises a $Co^{3+}$ or $Fe^{3+}$ ion, respectively, chelated in said compound.

8. The method of claim 7 wherein said compound comprises a protoporphyrin or an alkyl ester of a protoporphyrin.

9. The method of claim 7 wherein said compound comprises a non-proteinaceous compound containing a porphin ring and a nitrogenous base chelated to said $Co^{2+}$ or $Fe^{2+}$ 10. The method of claim 9 wherein said carrier fluid is an organic solvent.

11. The method of claim 10 wherein said carrier fluid and said nitrogenous base are the same.

12. The method of claim 11 wherein said nitrogenous base is 1-methylimidazole.

13. The method of claim 12 wherein said oxygen carrier is a heme/1-methylimidazole complex.

14. The method of claim 1 wherein said first electrode compartment and said second electrode compartment are in one electrochemical cell.

15. The method of claim 14 wherein said cell comprises an anode and a cathode comprising parallel plates of polytetrafluoroethylene or carbon covered with a thin layer of gold or platinum.

16. The method of claim 15 wherein said cathode and anode compartments have a thickness of no more than 5 mm.

17. The method of claim 1 wherein step (5) comprises utilizing said oxygen in a fuel cell.

18. The method of claim 1 wherein step (5) comprises collecting said free oxygen from said fluid through a gas permeable membrane into a region of low partial pressure of oxygen.

19. The method of claim 18 wherein said low partial pressure is maintained by consuming oxygen in a fuel burning engine.

20. The method of claim 18 wherein said low partial pressure is maintained by consumption of oxygen by a human or animal.

* * * * *